(12) United States Patent
Townsend, III et al.

(10) Patent No.: US 9,647,379 B2
(45) Date of Patent: May 9, 2017

(54) DUST AND DEBRIS TOLERANT DUAL POPPET VALVE CONNECTOR

(71) Applicant: The United States of America as Represented by the Administrator of the National Aeronautics and Space Administration, Washington, DC (US)

(72) Inventors: Ivan I. Townsend, III, Cocoa, FL (US); Robert P. Mueller, Cocoa Beach, FL (US); Gary L. Bastin, Palm Bay, FL (US); Jeffrey W. Carlson, Merritt Island, FL (US); Kevin A. Murtland, Mims, FL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 15/216,226

(22) Filed: Jul. 21, 2016

(65) Prior Publication Data

US 2016/0329653 A1    Nov. 10, 2016

Related U.S. Application Data

(62) Division of application No. 14/207,472, filed on Mar. 12, 2014, now Pat. No. 9,431,778.

(60) Provisional application No. 61/779,292, filed on Mar. 13, 2013, provisional application No. 61/779,200, filed on Mar. 13, 2013, provisional application No. 61/779,367, filed on Mar. 13, 2013, provisional application No. 61/779,045, filed on Mar. 13, 2013, provisional application No. 61/778,387, filed on Mar. 12, 2013.

(51) Int. Cl.
| | |
|---|---|
| H01R 13/52 | (2006.01) |
| H01R 13/447 | (2006.01) |
| H01R 13/533 | (2006.01) |
| F16L 55/24 | (2006.01) |
| F16L 55/115 | (2006.01) |
| H01R 13/639 | (2006.01) |
| F16L 25/01 | (2006.01) |
| H01R 13/00 | (2006.01) |

(52) U.S. Cl.
CPC ............ *H01R 13/52* (2013.01); *F16L 55/115* (2013.01); *F16L 55/24* (2013.01); *H01R 13/447* (2013.01); *H01R 13/5213* (2013.01); *H01R 13/533* (2013.01); *H01R 13/6392* (2013.01); *F16L 25/01* (2013.01); *H01R 13/005* (2013.01); *H01R 13/5219* (2013.01); *Y10T 137/87925* (2015.04)

(58) Field of Classification Search
None
See application file for complete search history.

(56) References Cited

U.S. PATENT DOCUMENTS

| | | |
|---|---|---|
| 3,982,804 A | 9/1976 | Marechal |
| 5,582,521 A | 12/1996 | Mori |

(Continued)

*Primary Examiner* — Tho D Ta
(74) *Attorney, Agent, or Firm* — Michelle L. Ford; B. Delano Jordan

(57) ABSTRACT

A debris exclusion and removal apparatus for connectors which have a dual-poppet value configuration containing a pressurized substance. Coupling of the female and male connectors causes the poppet valve to eject a cleaning substance which will eliminate debris from the male connector prior to mating with the female connector.

5 Claims, 40 Drawing Sheets

(56) References Cited

U.S. PATENT DOCUMENTS

| | | | |
|---|---|---|---|
| 5,743,752 | A | 4/1998 | Massebeuf |
| 5,980,278 | A | 11/1999 | Winkler |
| 6,039,602 | A | 3/2000 | Witkowski |
| 6,056,010 | A * | 5/2000 | Wells ............... F16L 37/34 137/614 |
| 7,201,590 | B1 | 4/2007 | Chen |
| 7,470,858 | B2 | 12/2008 | McNutt |
| 7,762,824 | B2 * | 7/2010 | Smith, III ........... E21B 33/0385 439/192 |
| 8,056,581 | B2 * | 11/2011 | Danielson ............... F16L 37/23 137/614 |
| 8,177,575 | B2 | 5/2012 | Katagiyama |
| 2010/0136808 | A1 | 6/2010 | Vanzo |

* cited by examiner

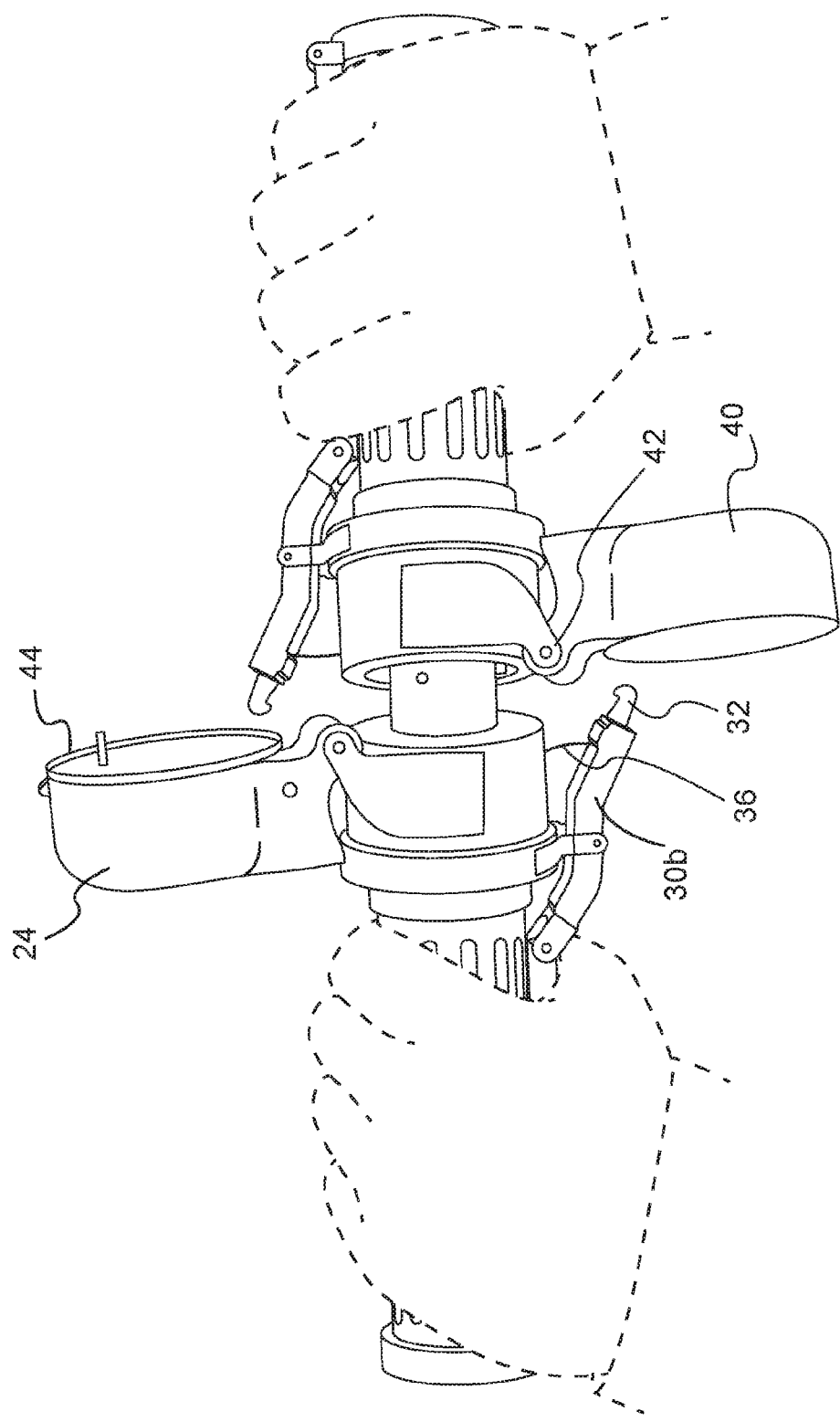

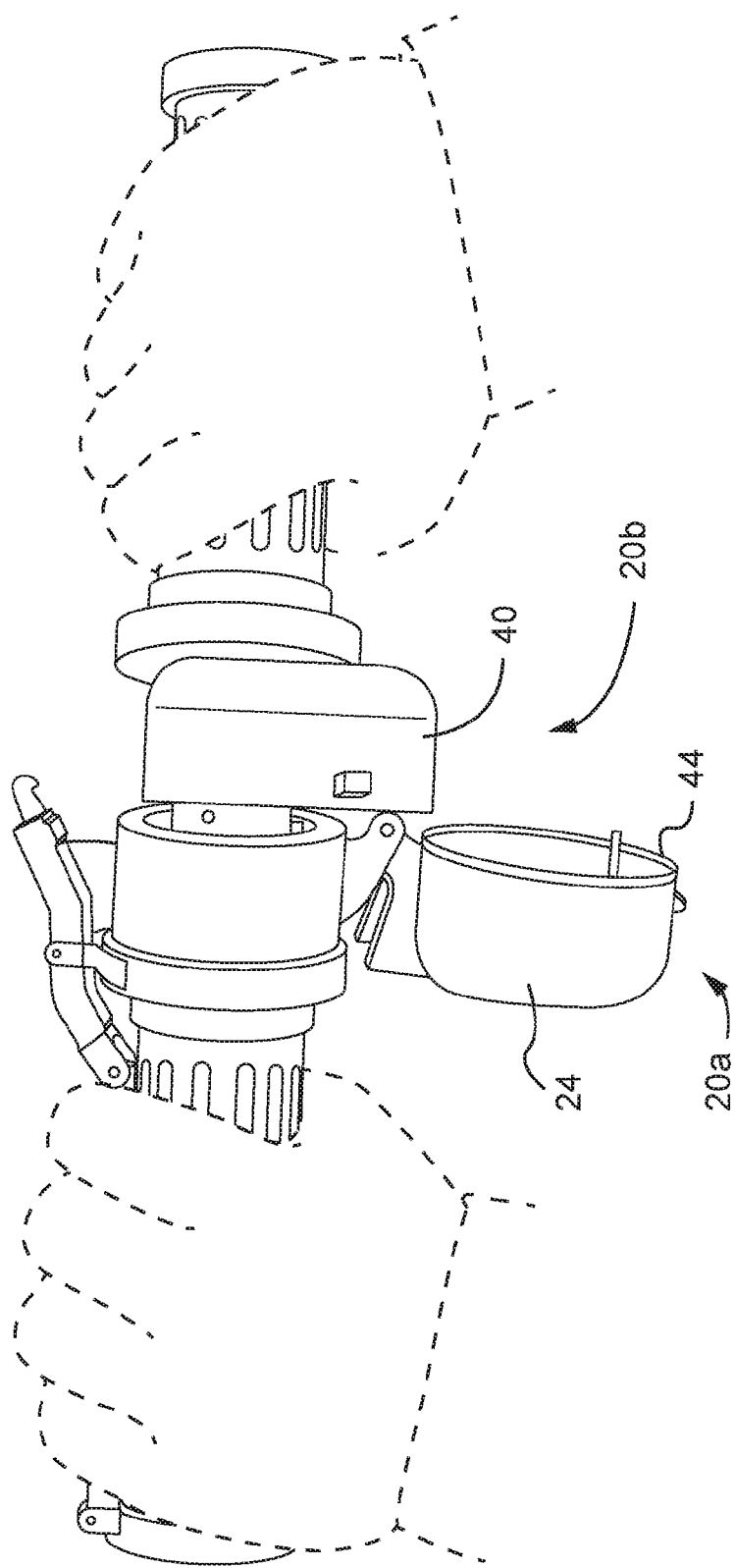

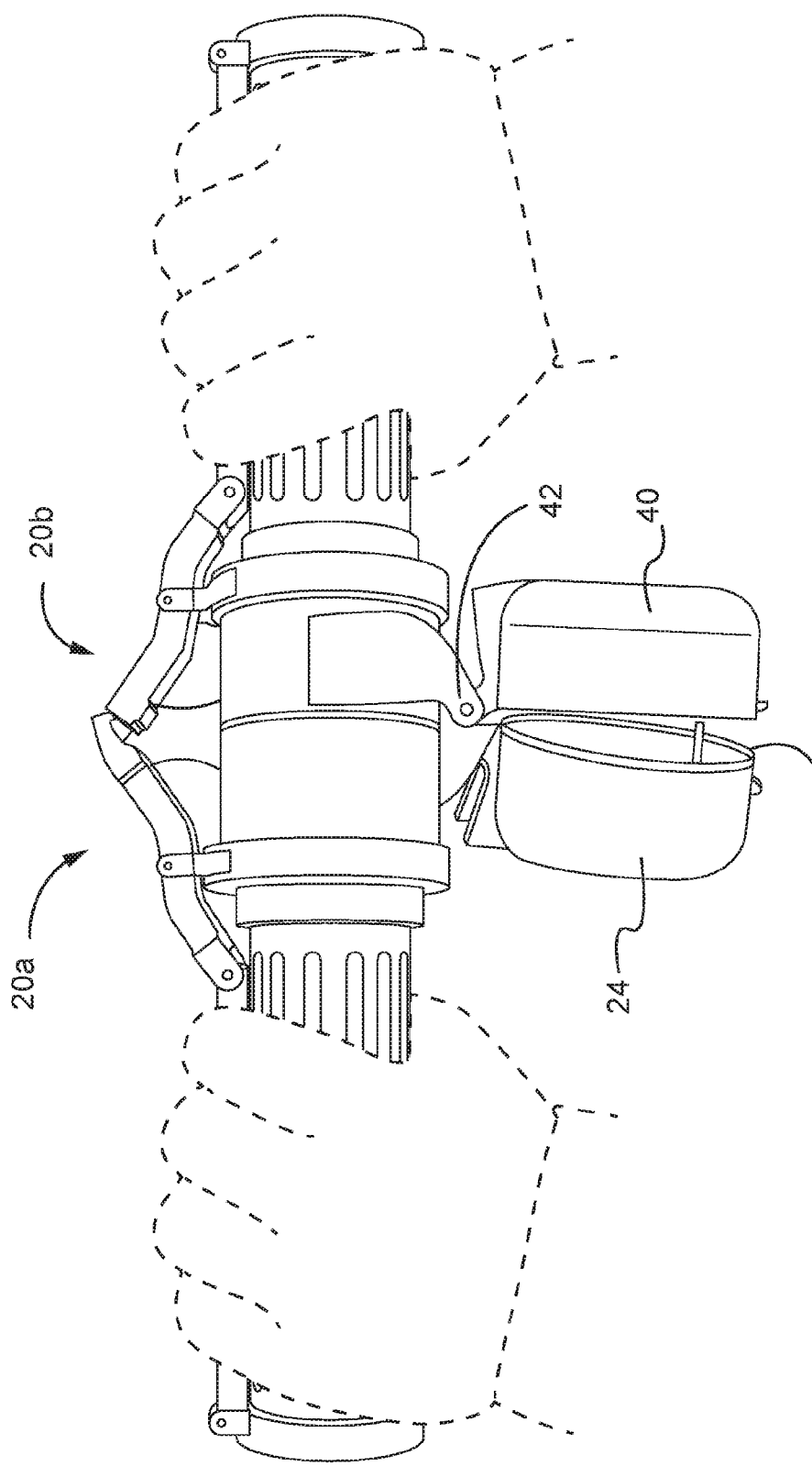

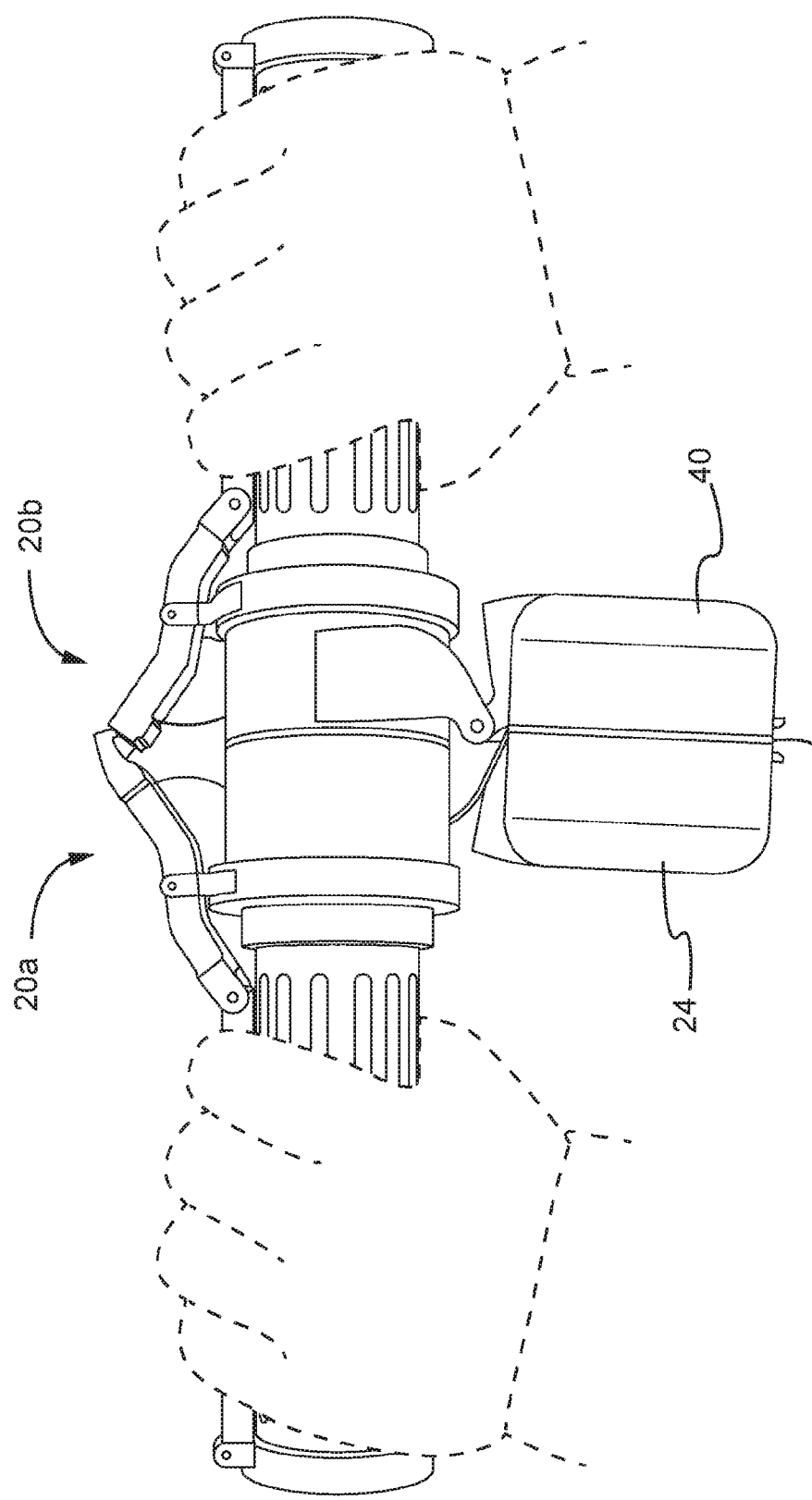

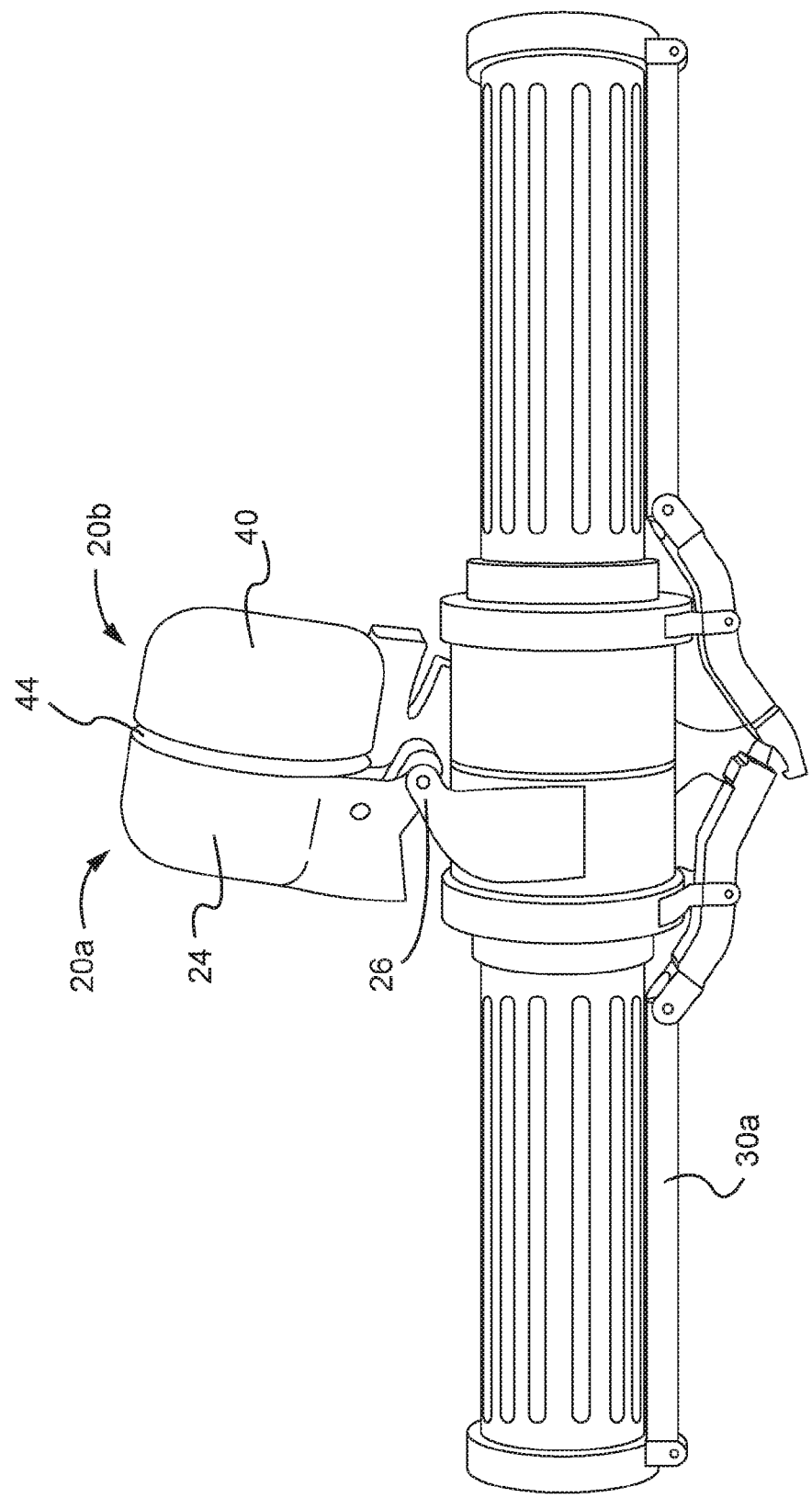

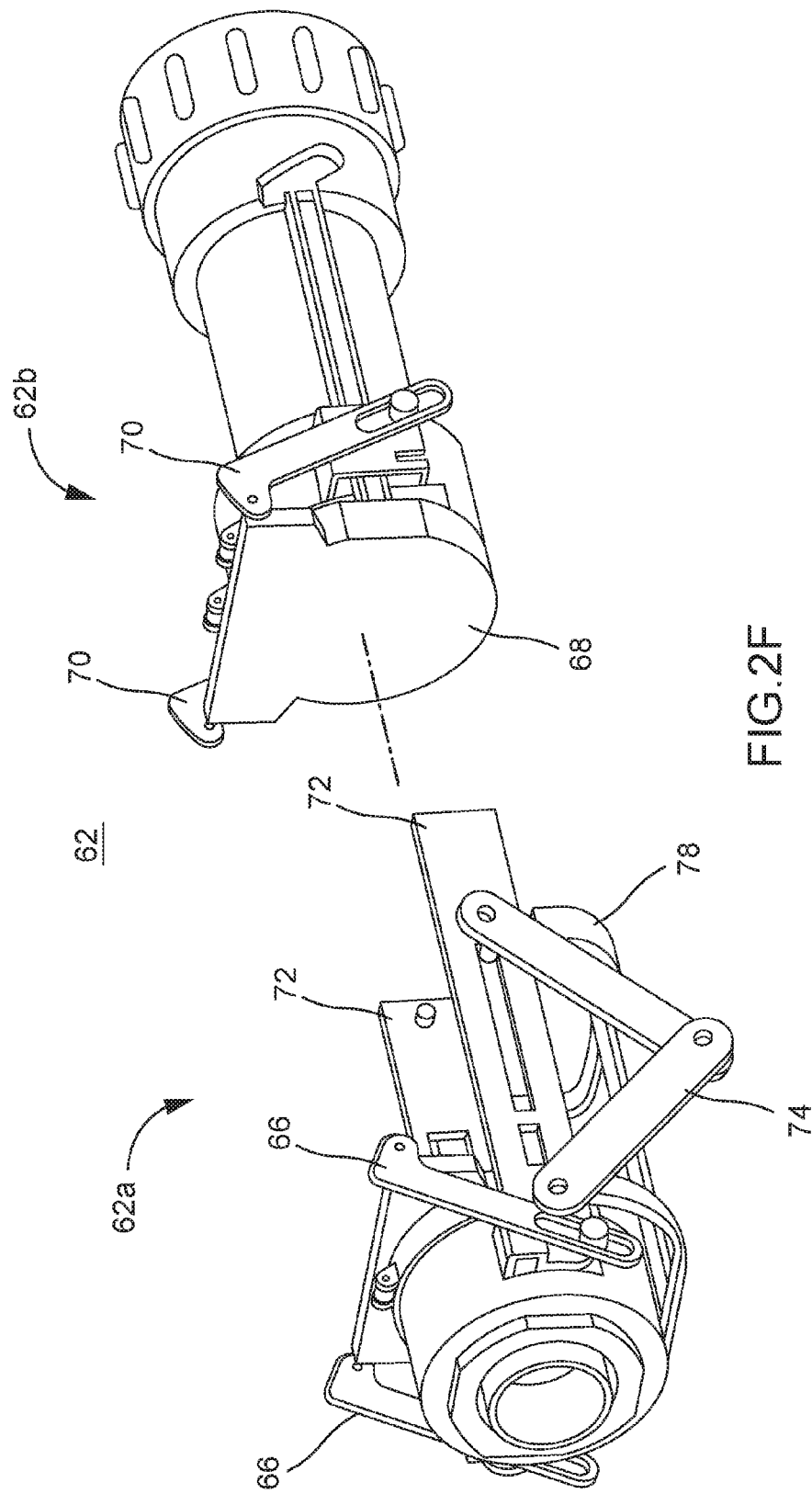

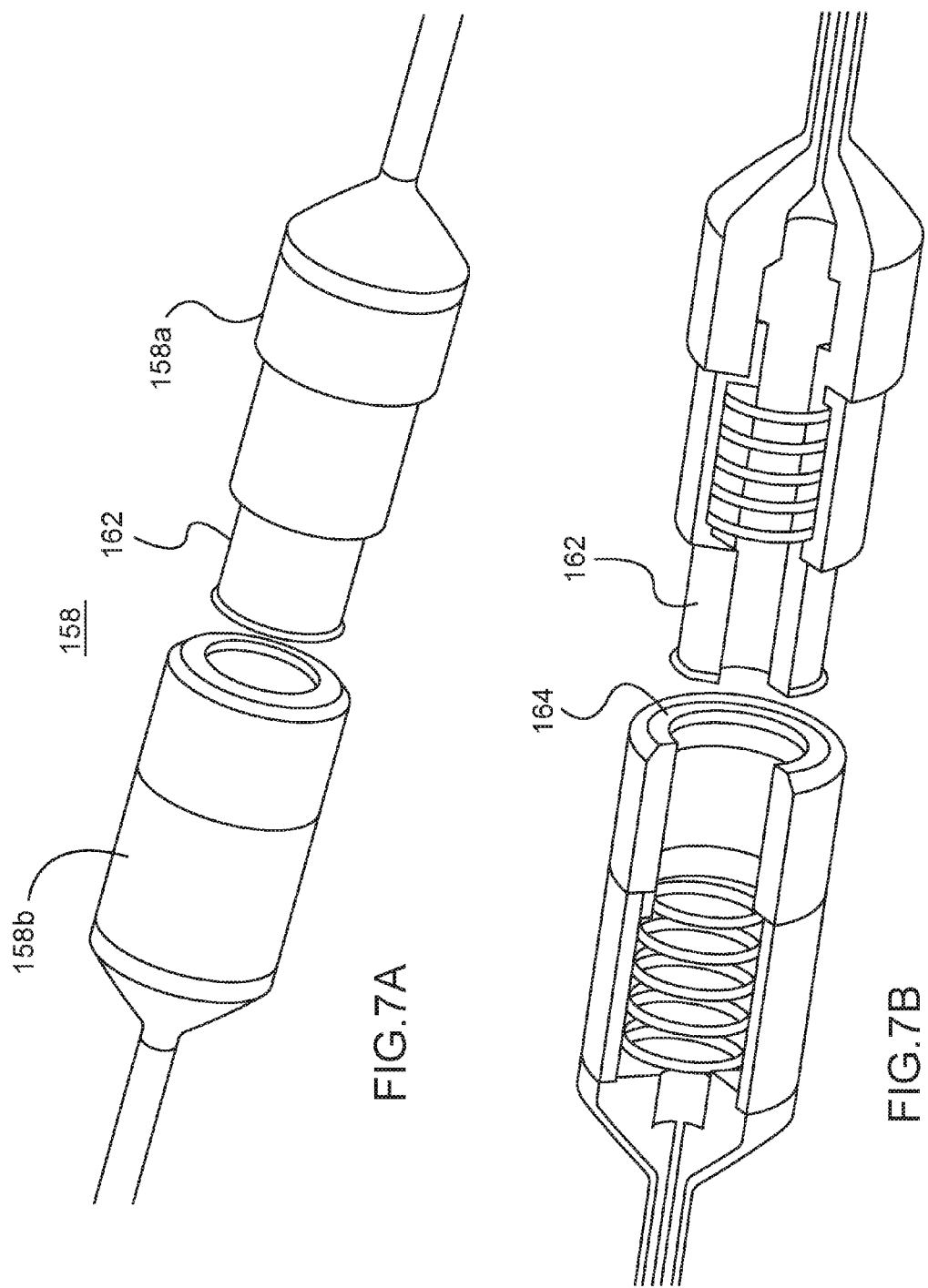

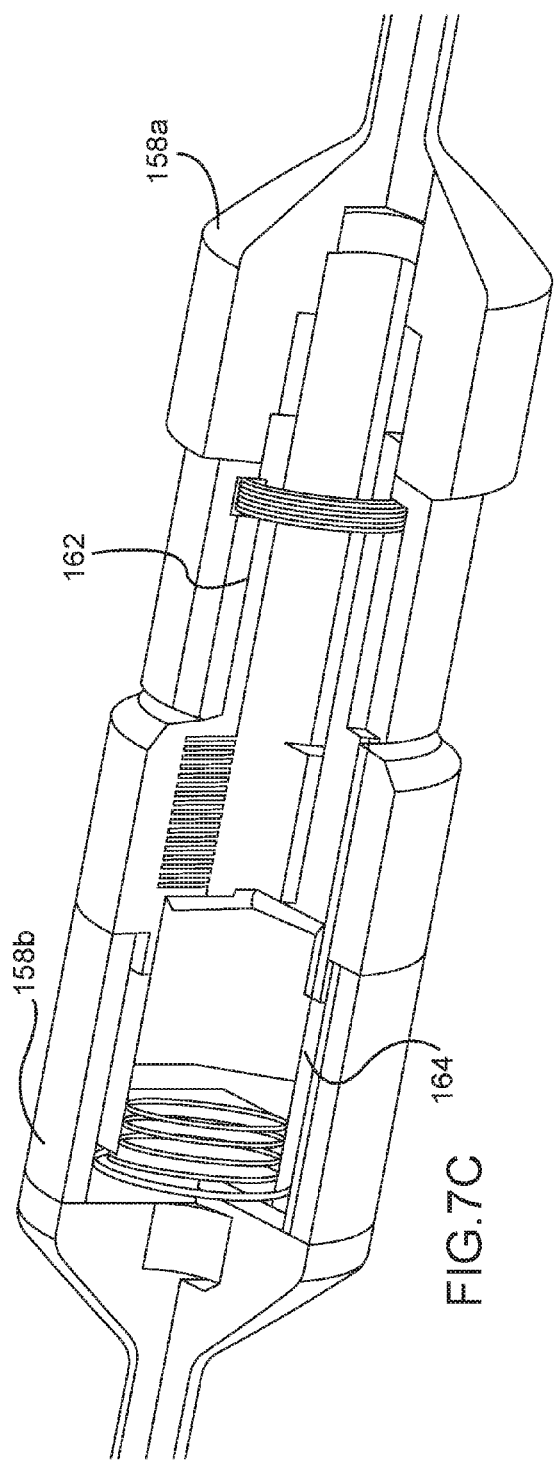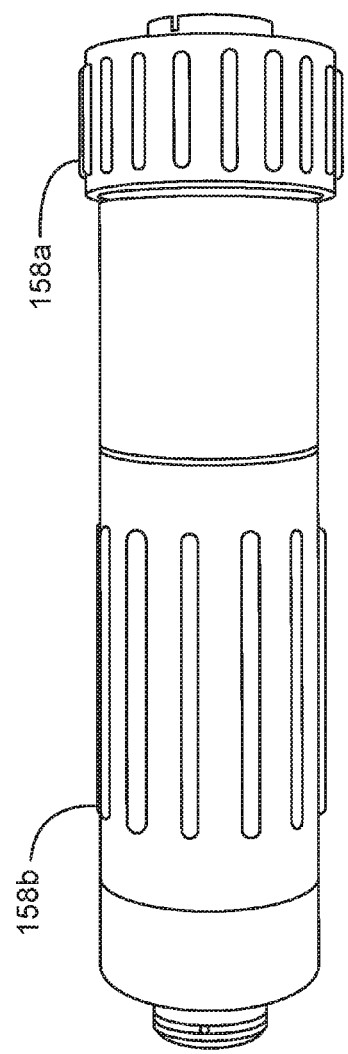

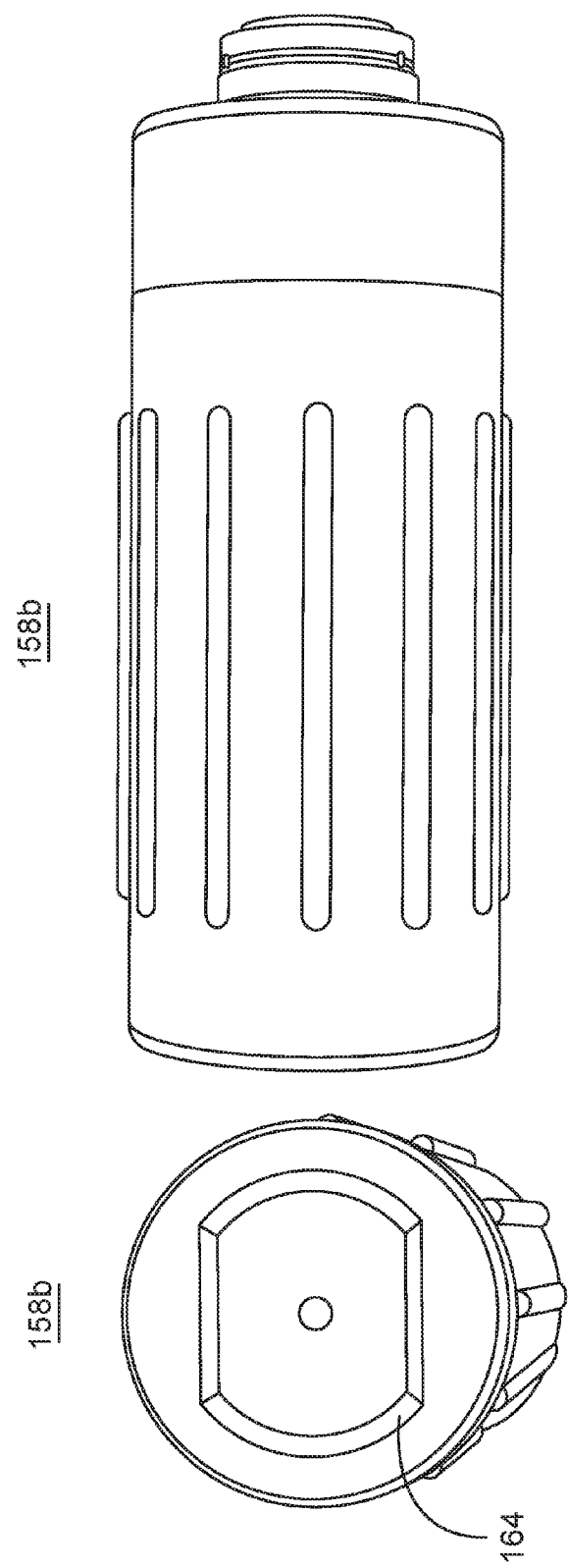

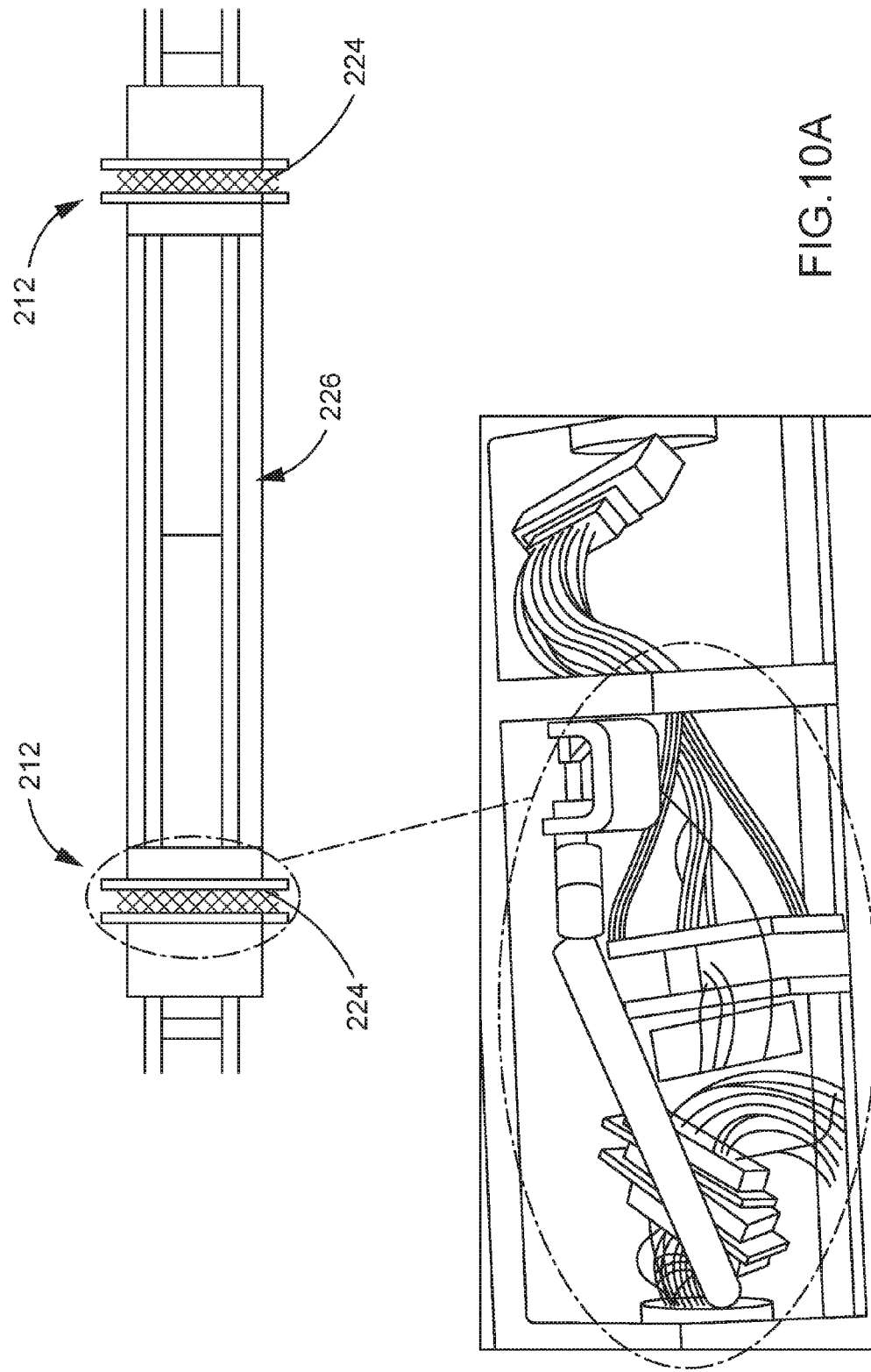

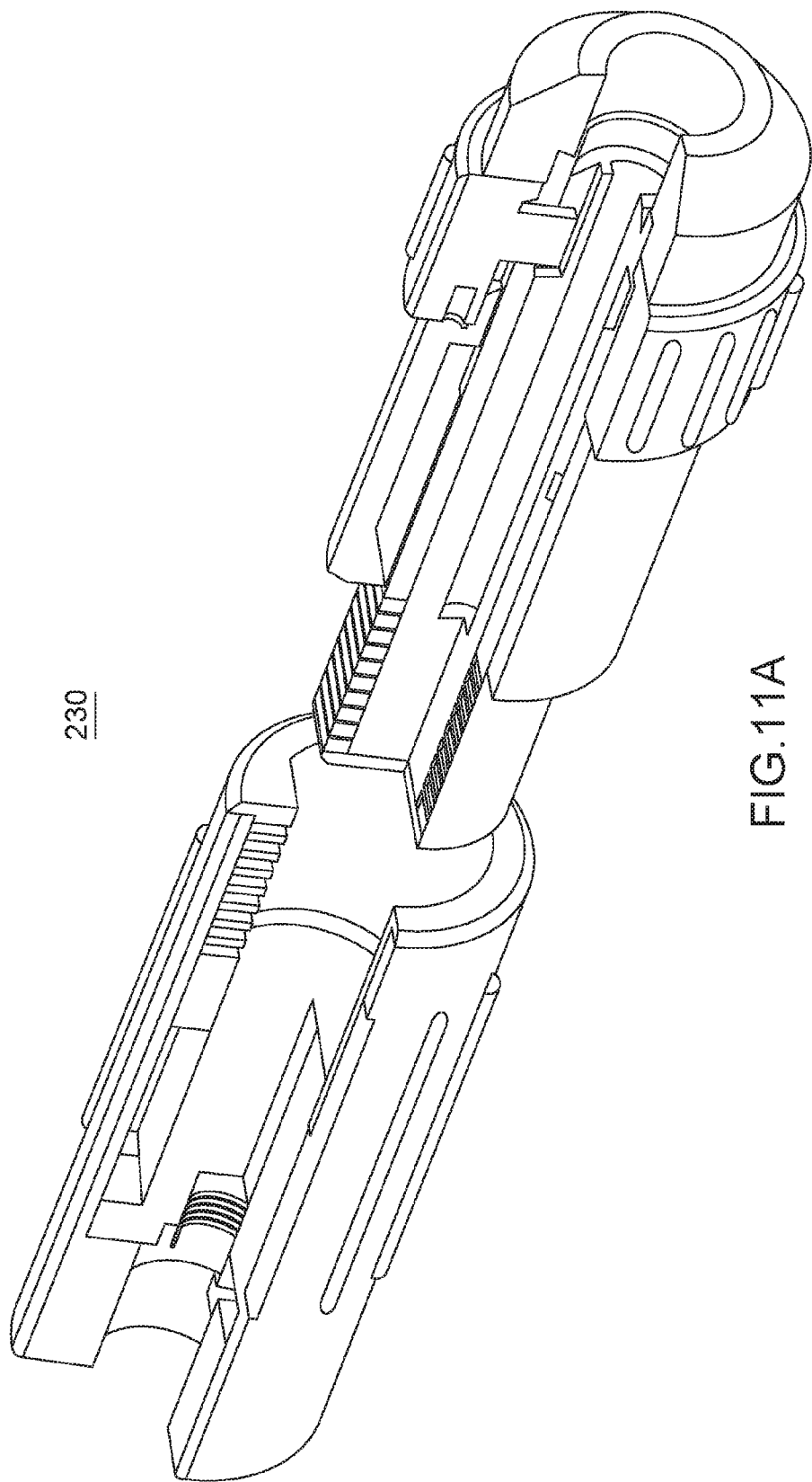

DUST AND DEBRIS TOLERANT DUAL POPPET VALVE CONNECTOR

CROSS-REFERENCE TO RELATED APPLICATIONS

This application is a divisional of U.S. patent application Ser. No. 14/207,472, filed on Mar. 12, 2014, and claims the benefit of priority under 35 U.S.C. §119(e) to U.S. Provisional Application Ser. No. 61/778,387, filed Mar. 12, 2013; Provisional Application Ser. No. 61/779,045, filed on Mar. 13, 2013; Provisional Application Ser. No. 61/779,200, filed on Mar. 13, 2013; Provisional Application Ser. No. 61/779,292, filed on Mar. 13, 2013; and Provisional Application Ser. No. 61/779,367, filed on Mar. 13, 2013, the contents of which are incorporated herein by reference in their entirety.

ORIGIN OF THE INVENTION

The invention described herein was made in the performance of work under a NASA contract and by employees of the United States Government and may be manufactured and used by or for the Government for governmental purposes without the payment of any royalties thereon or therefore.

BACKGROUND OF THE INVENTION

Technical Field

Embodiments of the invention generally relate to connectors. More particularly, embodiments relate to dust tolerant connectors. Some embodiments also relate to an intelligent connector system capable of detecting damage to or faults within a conductor and then rerouting the energy to a non-damaged spare conductor.

Discussion

Connectors of the present invention may be used to transfer electrical current, fluid, and gas in a wide variety of environments containing dust and other debris, wherein that debris may present substantial challenges. For example, lunar/Martian dust intrusion and/or accumulation in connectors used to transfer oxygen, hydrogen, nitrogen, etc., may lead to larger system failures as well as loss of life in extraterrestrial human exploration endeavors. Additionally, embodiments of the present invention may also be suitable for use where connectors must resist water intrusion, such as terrestrial deep water operations.

BRIEF DESCRIPTION OF THE DRAWINGS

The various advantages of the embodiments of the present invention will become apparent to one skilled in the art by reading the following specification and appended claims, and by referencing the following drawings, in which:

FIGS. 1A-1H show isometric and side views of examples of apparatuses having inverting end caps with a multi-axis lever configuration according to embodiments;

FIGS. 2A-2J show isometric and side views of examples of apparatuses having inverting end caps with enlarged handle and/or side rail configurations according to embodiments;

FIGS. 7A-7H show isometric, cut-away, side and end views of an example of a retractable cover configuration according to embodiments;

FIGS. 10A and 10B show block diagrams of examples of an intelligent electrical connector according to an embodiment; and FIGS. 11A-11D show isometric and cut-away views of an example of a retractable cover configuration according to additional embodiments.

DETAILED DESCRIPTION OF THE INVENTION

The intrusion and/or accumulation of dust and other debris or contaminants within electrical, fluid, and/or gas connectors may be prevented via a number of techniques described herein. The techniques may provide for rapid, clean connections, as well as quick disconnect (QD) operability by individuals wearing thick gloves (e.g., astronauts, drilling personnel, manufacturing personnel, deep-sea divers, etc.) without compromising the internal or external mating surfaces. For example, debris exclusion and removal apparatuses having 1) inverting end caps with a multi-axis lever configuration, 2) inverting end caps with enlarged handle and/or side rail configurations, 3) rotating end cap configurations, 4) poppet valve configurations, 5) O-ring configurations, 6) filament barrier configurations, 7) retractable cover configurations, 8) clamshell end cap configurations, etc., or any combination thereof, may be used to improve both the operability and the safety of connections in a wide variety of harsh environments.

Inverting End Caps—Multi-Axis Lever

Figure 1A:
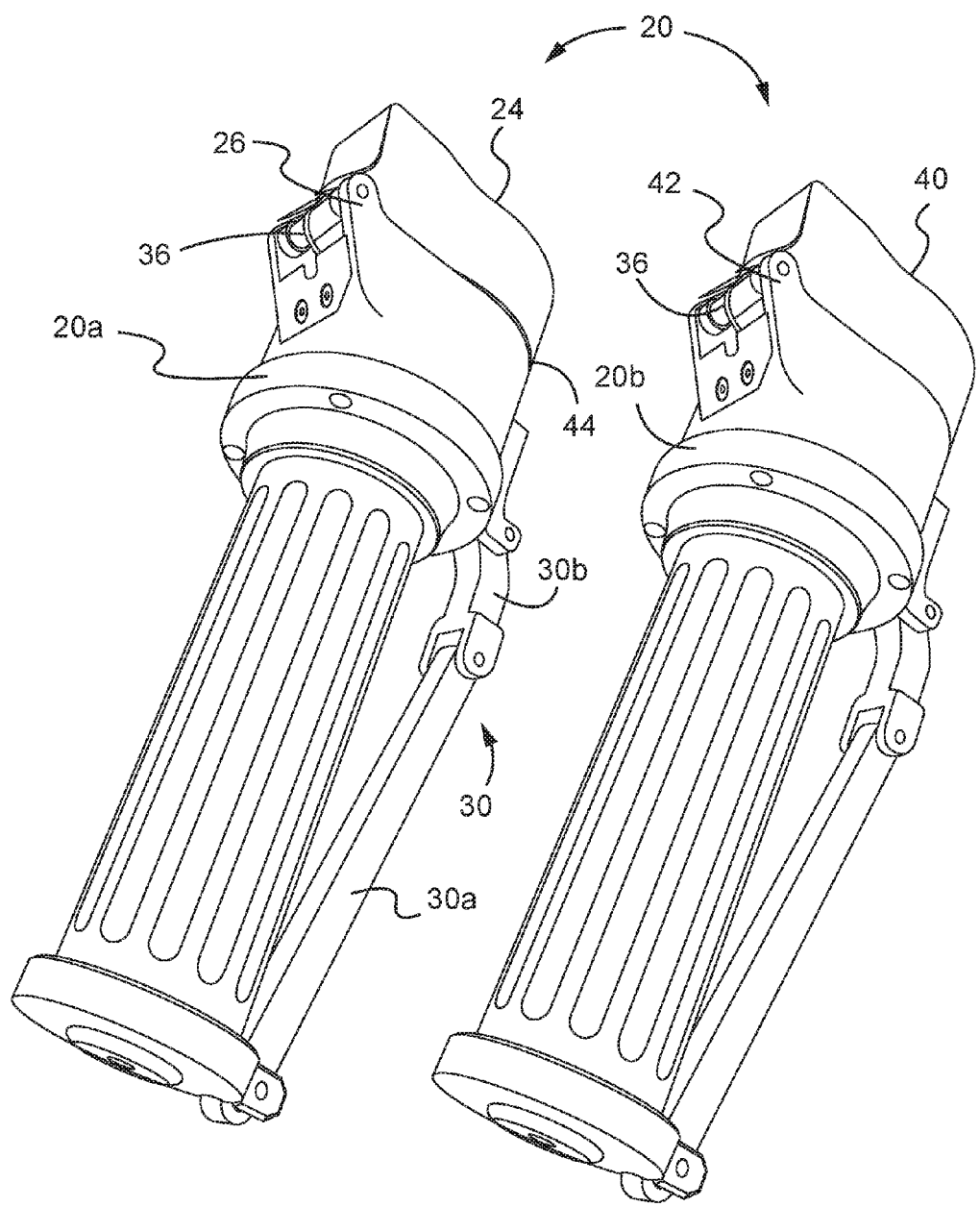
Figure 1B:
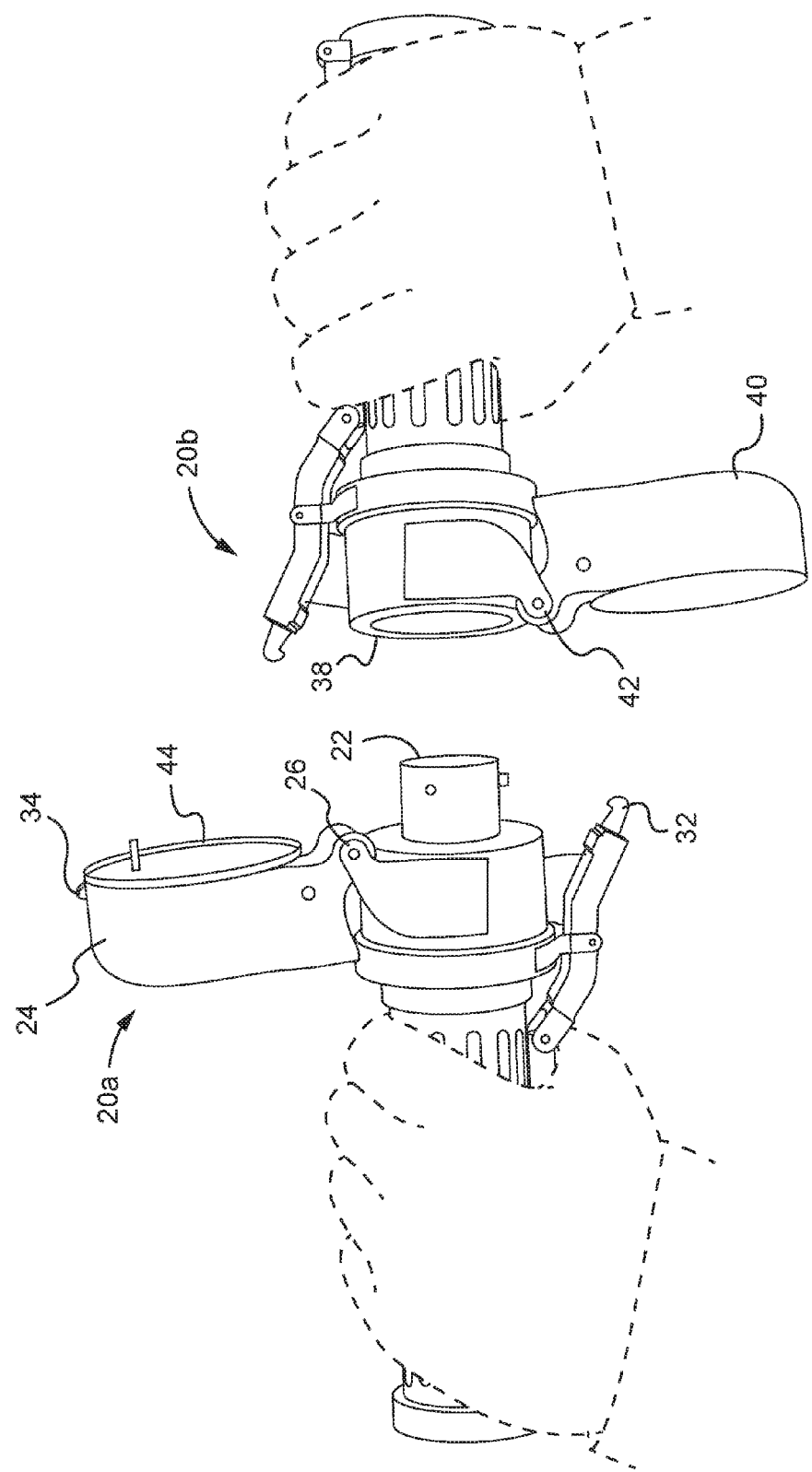
Figure 1H:
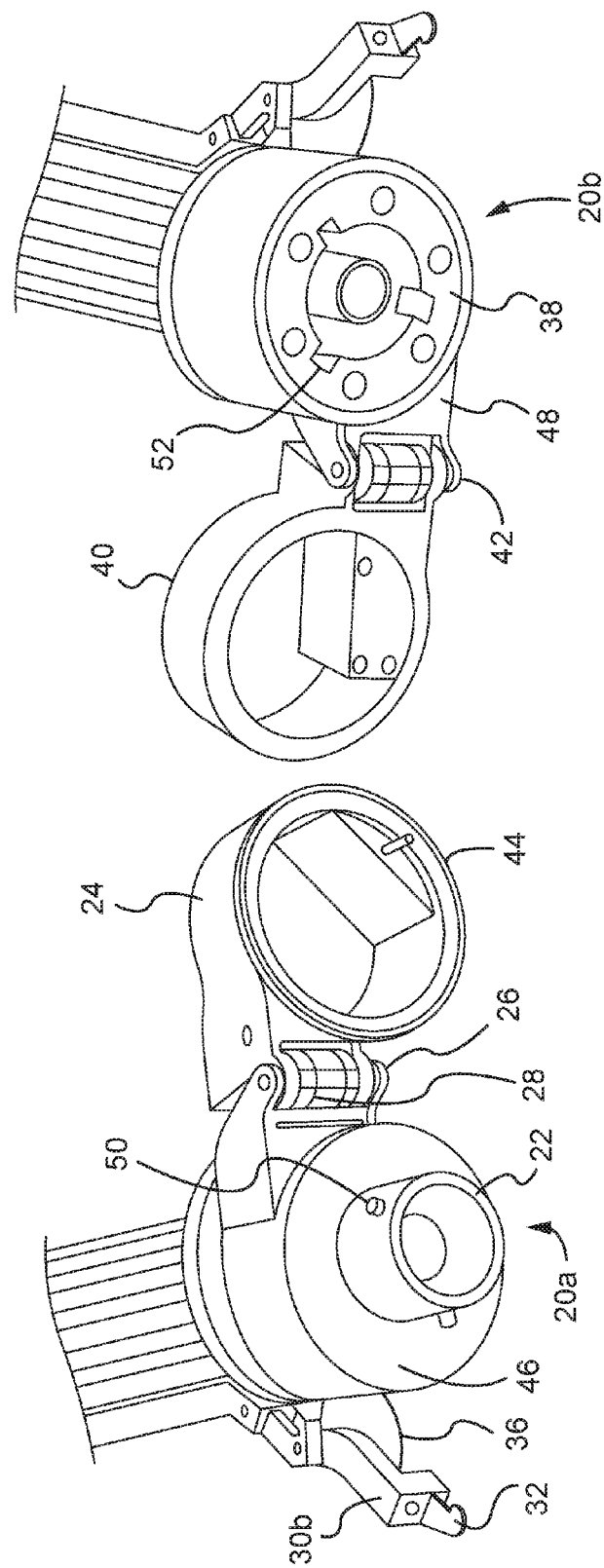

FIGS. 1A-1H show a set of housings 20 (20a, 20b) that may be used to couple a corresponding pair of connectors (not shown) to one another in an environment containing dust, debris, and/or other contaminants. As best shown in FIGS. 1B and 1H, a first housing 20a may include an open end 22 and one or more surfaces defining a first cavity to receive/contain a first connector such as, for example, an electrical connector, a fluid connector, a gas connector, etc., or any combination thereof. The illustrated first housing 20a also has a first cap 24 (e.g., an "end cap") that is movable between a closed position (e.g., as shown in FIG. 1A) in which the open end 22 of the first housing 20a is covered by the first cap 24 and an open position (e.g., as shown in FIGS. 1B-1H) in which the open end 22 of the first housing 20a is not covered by the first cap 24.

In addition, a first hinge 26 may be coupled to the first housing 20a and the first cap 24, wherein the first hinge 26 inverts the first cap 24 between the closed position and the open position. As best shown in FIG. 1H, the first hinge 26 may include a bending tension spring 28 having a shape memory alloy that biases the first cap 24 toward the closed position. Such a biasing operability may ensure that the first housing 20a automatically closes before touching the ground if dropped by an individual handling the first housing 20a. Indeed, the automatic closing of the first housing 20a may be particularly advantageous if the ground and/or floor of the environment contains a relatively large amount of debris or other contaminants.

The illustrated first housing 20a also includes a first multi-axis lever 30 (e.g., a "lazy tong") coupled to the external surface of the first housing 20a and the first hinge 26. The first multi-axis lever 30 (30a, 30b) may generally invert the first cap 24 to the open position (e.g., actuate) when the first multi-axis lever 30 is squeezed toward the external surface of the first housing 20a. In the illustrated example, the first multi-axis lever 30 includes a first member 30a having a fixed end coupled to the first housing 20a via a pin that provides an axis of rotation, and a second member 30b having a first free end coupled to a free end of the first member 30a via another pin that provides another axis of rotation. The second member 30b may also have an intermediate point coupled to the first housing 20a via a pin that provides yet another axis of rotation so that squeezing the first member 30a toward the external surface of the first housing 20a causes a second free end of the second member 30b to rotate away from external surface of the first housing 20a.

As best seen in FIGS. 1B and 1H, the second free end of the second member 30b may include a hook 32 and the first cap 24 may include a protrusion 34 at a periphery of the first cap 24, wherein the hook 32 engages with the protrusion 34 when the first cap 24 is in the closed position. Moreover, the second free end of the second member 30b may be coupled to the first cap 24 via a cable 36 that enters the first housing 20a on one side wraps around an interior region of the first housing 20a, exits the first housing 20a on the other side, loops over the pin of the first hinge 26 (as best shown in FIG. 1A) and attaches to the first cap 24. Accordingly, when the second free end of the second member 30b moves away from the first housing 20a, the cable 36 pulls the first cap 24 to the open position, in the illustrated example. Of particular note is that the illustrated approach provides a relatively high amount of rotational movement on the part of the first cap 24 (e.g., 180°+), by virtue of a relatively small amount of linear movement of the free end of the first member 30a (e.g., on the order of centimeters). As a result, the illustrated first housing 20a can be actuated with very little effort by individuals wearing thick gloves (e.g., having limited manual dexterity).

In addition, a second housing 20b may include an open end 38 and one or more surfaces defining a second cavity to receive/contain a second connector such as, for example, an electrical connector, a fluid connector, a gas connector, etc., or any combination therefore, that mates with the first connector of the first housing 20a. The illustrated second housing 20b has a second cap 40 (e.g., end cap) coupled to the second housing 20b, and a second hinge 42 coupled to the second housing 20b and the second cap 40, wherein the second hinge 42 inverts the second cap 40 between the closed position and the open position. As best shown in FIGS. 1F and 1G, when the open end of the first housing 20a and the open end of the second housing 20b are coupled to one another, the first cap 24 and the second cap 40 seal one another.

In this regard, the first cap 24 may also include a gasket 44 to effectuate the seal between the first cap 24 and the second cap 40. Moreover, the gasket 44 may be used to improve the seal between the first cap 24 and a corresponding surface 46 (e.g., best shown in FIG. 1H) of the first housing 20a when the first cap 24 is in the closed position. A similar gasket (not shown) may be provided on a surface 48 (e.g., best shown in FIG. 1H) of the second housing 20b that interfaces with the second cap 40 when the second cap 40 is in the closed position. Additionally, the open end 22 of the first housing 20a may include a set of laterally extending protrusions 50 that correspond to a set of apertures 52 in the open end 38 of the second housing 20b, wherein the protrusions 50 and apertures 52 operate as a cam and groove coupling that locks the first and second housings 20 to one another via rotation. The rotation may in fact cause a friction based removal of contaminants from surfaces such as, for example, the surface 46 and/or the surface 48. The second housing 20b may have a multi-axis lever similar to that of the first housing 20a.

Inverting End Caps—Enlarged Handle and/or Side Rail

Figure 2A:
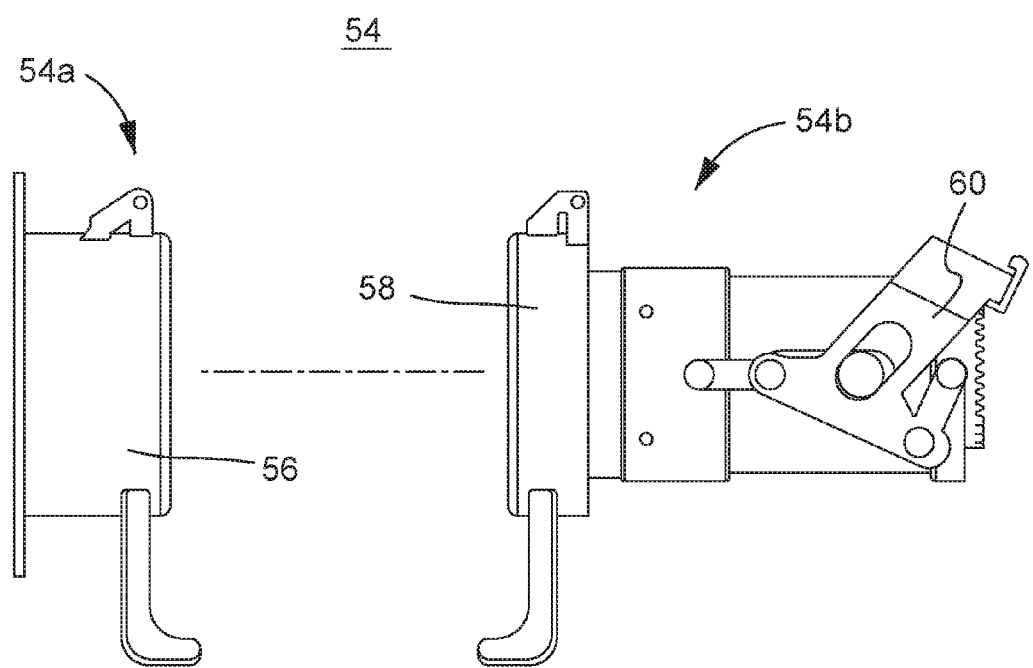
Figure 2B:
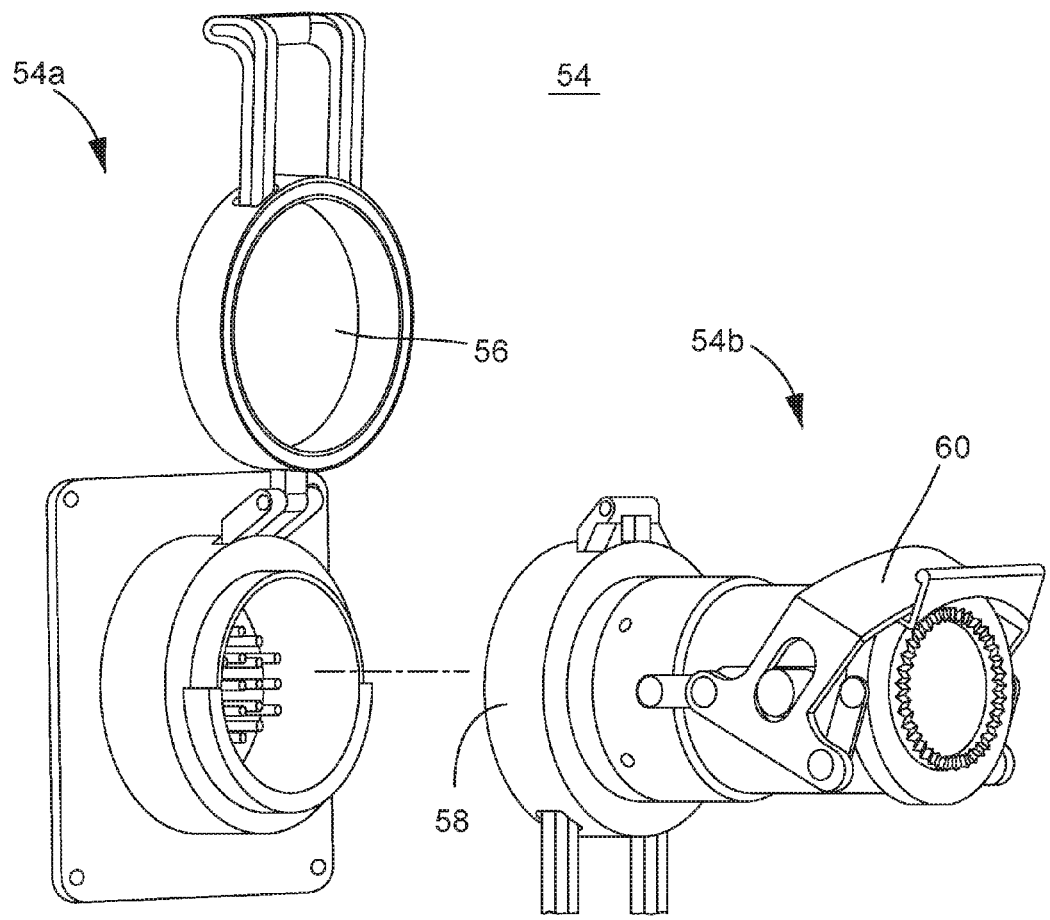

FIGS. 2A-2E show another example of a set of housings 54 (54a, 54b) that may be used to couple a corresponding pair of connectors to one another in an environment containing dust and/or other debris. A first housing 54a may have an open end and one or more surfaces defining a first cavity to receive/contain a first connector (e.g., including a set of pins, as best shown in FIG. 2B). The first housing 54a may also include a first cap 56 coupled to the first housing 54a, wherein the first cap 56 is movable between a closed position (e.g., as shown in FIG. 2A) in which the open end of the first housing 54a is covered by the first cap 56 and an open position (e.g., as shown in FIGS. 2B-2E) in which the open end of the first housing 54a is not covered by the first cap 56. In addition, a first hinge may be coupled to the first housing 54a and the first cap 56, wherein the first hinge inverts the first cap 56 between the closed position and the open position.

Figure 2C:
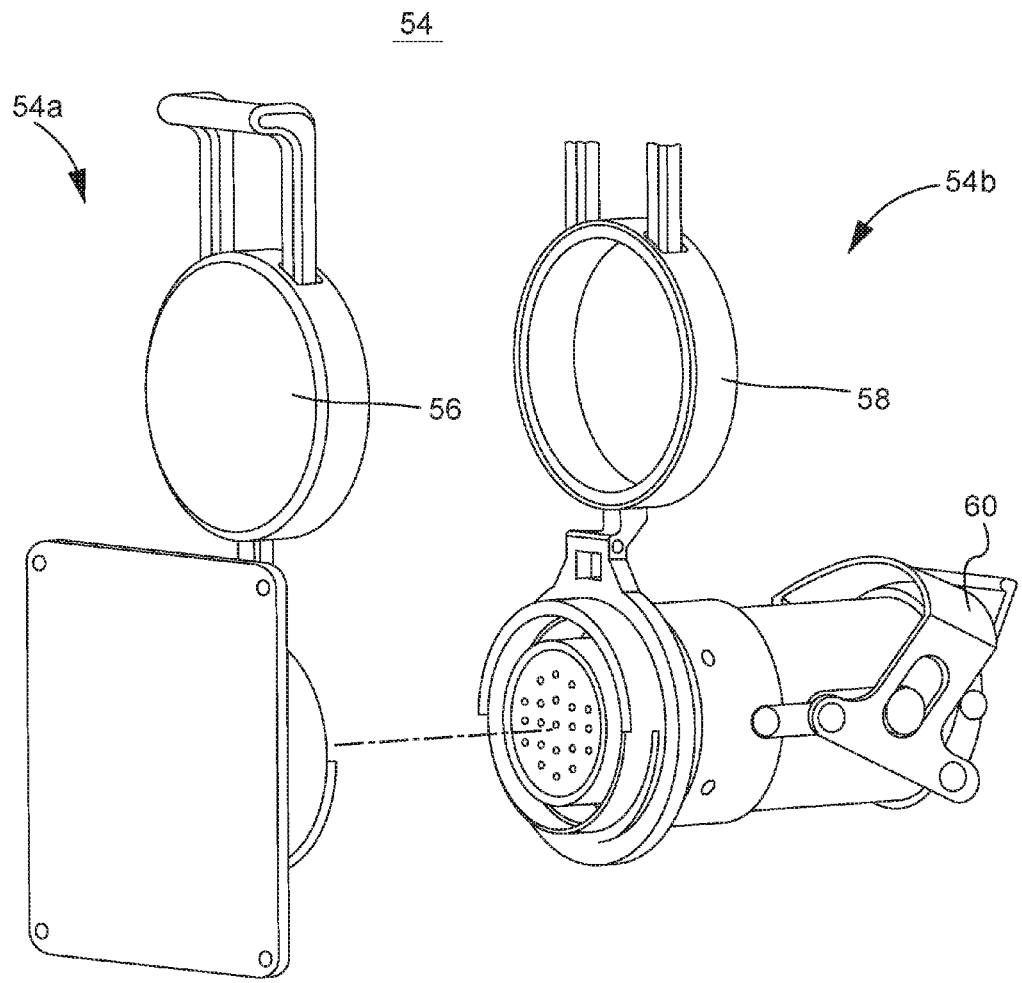
Figure 2D:
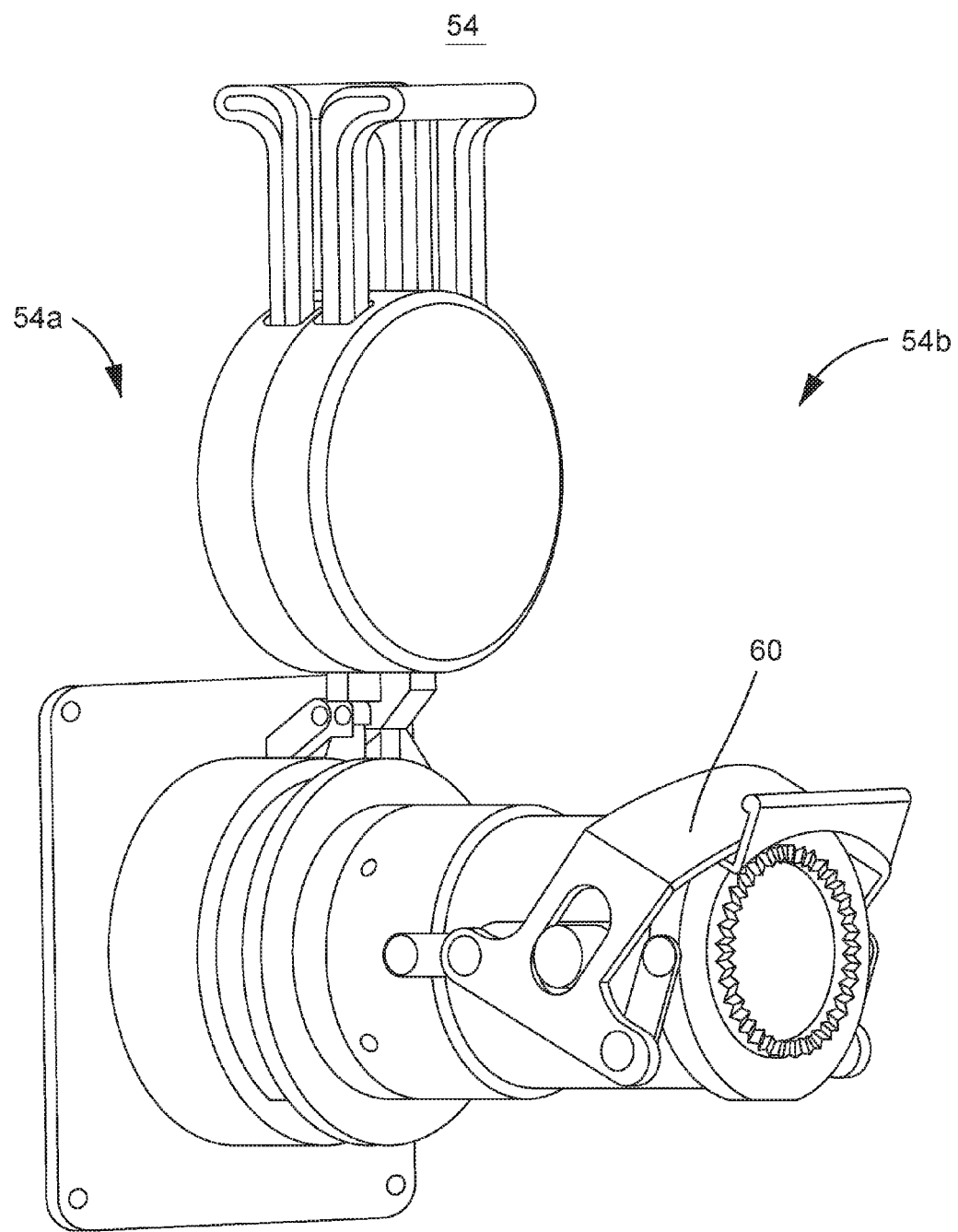
Figure 2E:
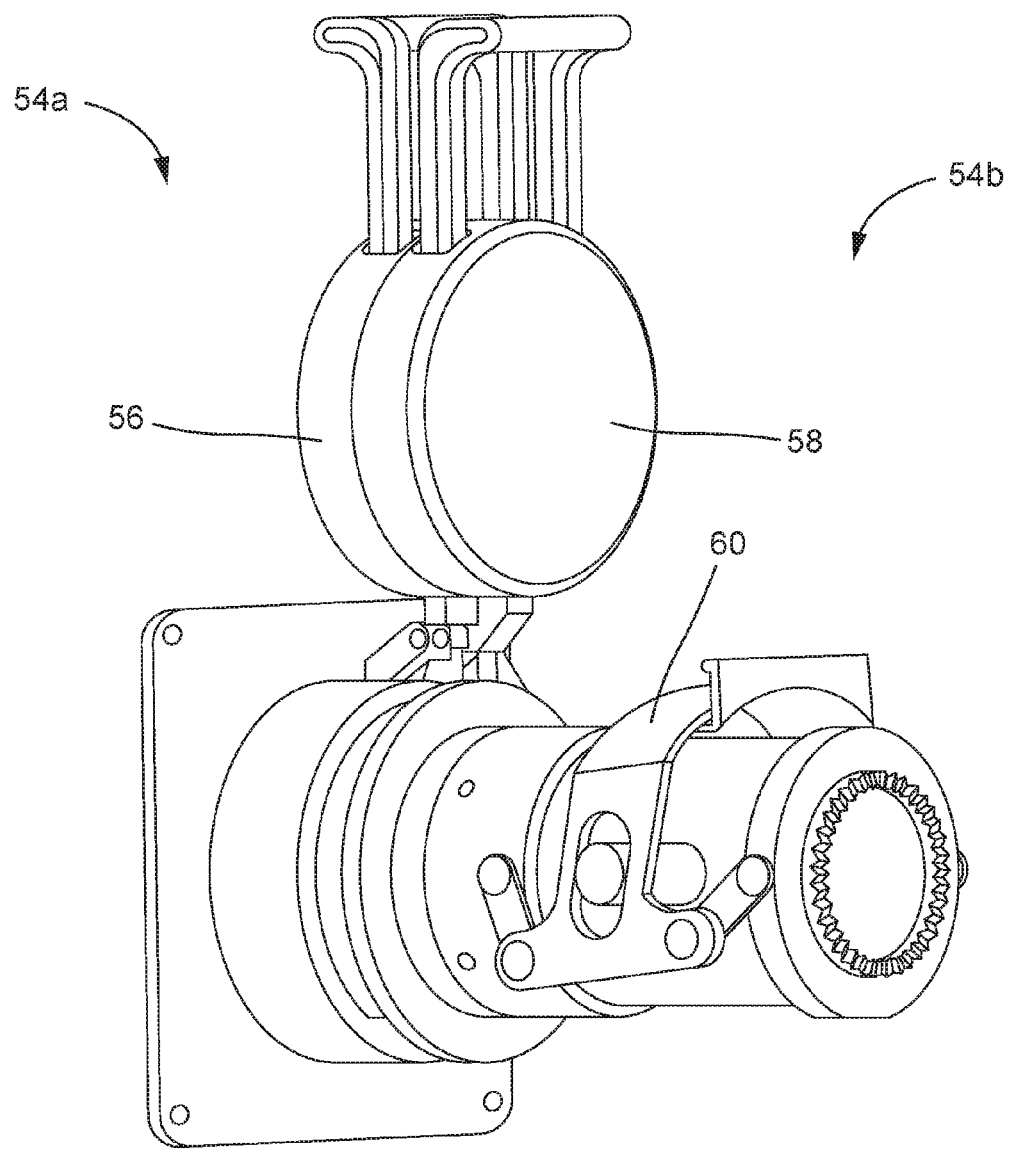

Similarly, a second housing 54b may include an open end (e.g., as best shown in FIG. 2C) and one or more surfaces defining a second cavity to receive/contain a second connector (e.g., including a socket, as best shown in FIG. 2C). The illustrated second housing 54b also includes a second cap 58 coupled to the second housing 54b and a second hinge coupled to the second housing 54b and the second cap 58, wherein the second hinge inverts the second cap 58 between the closed position and the open position. As best shown in FIGS. 2D and 2E, when the open end of the first housing 54a and the open end of the second housing 54b are coupled to one another, the first cap 56 and the second cap 58 may seal one another.

More particularly, a first handle is coupled to the first cap 56, a second handle is coupled to the second cap 58, and a locking system is used to effectuate the seal between the first cap 56 and the second cap 58, in the illustrated example. The locking system may include an actuation rod extending laterally through a longitudinal slot of the second housing 54b and a rotatable sleeve 60 external to the second housing 54b. In one example, the actuation rod is coupled to the second connector and the rotatable sleeve 60 is coupled to the actuation rod so that rotating the sleeve 60 upward (e.g., counterclockwise in FIG. 2A pushes the actuation rod forward in the longitudinal slot and in turn fully mates the two connectors with one another so that the caps 56, 58 press against one another. Moreover, an additional component such as a torsional spring may be used at the hinged connection between the caps 56, 58 and their respective housings in order to bias the caps 56, 58 toward one another in the mated position. The enlarged handles and the locking mechanism may enable the housings 54 to be connected with very little effort by individuals wearing thick gloves.

Figure 2G:
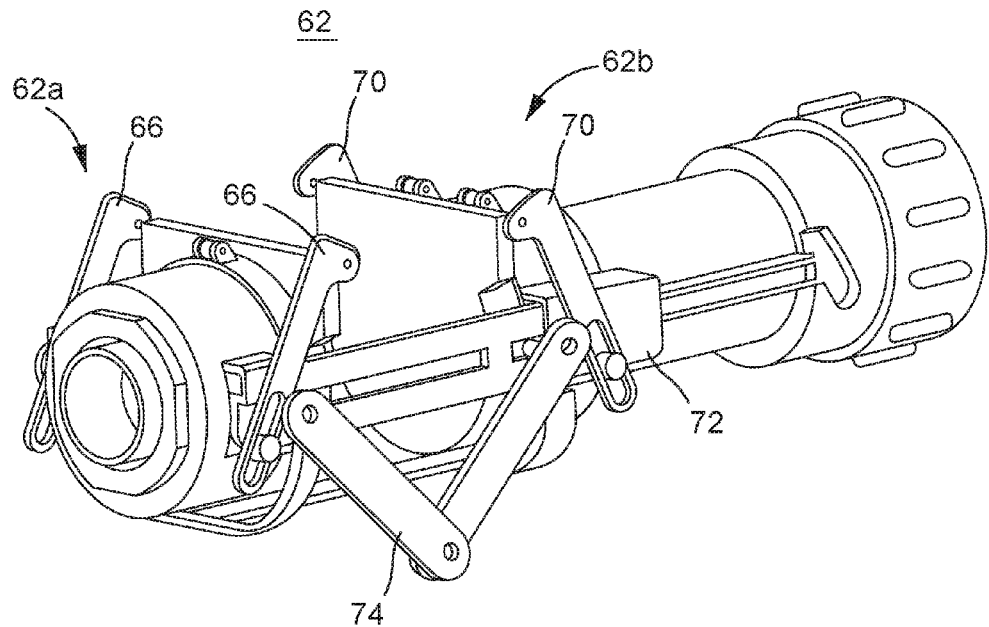
Figure 2H:
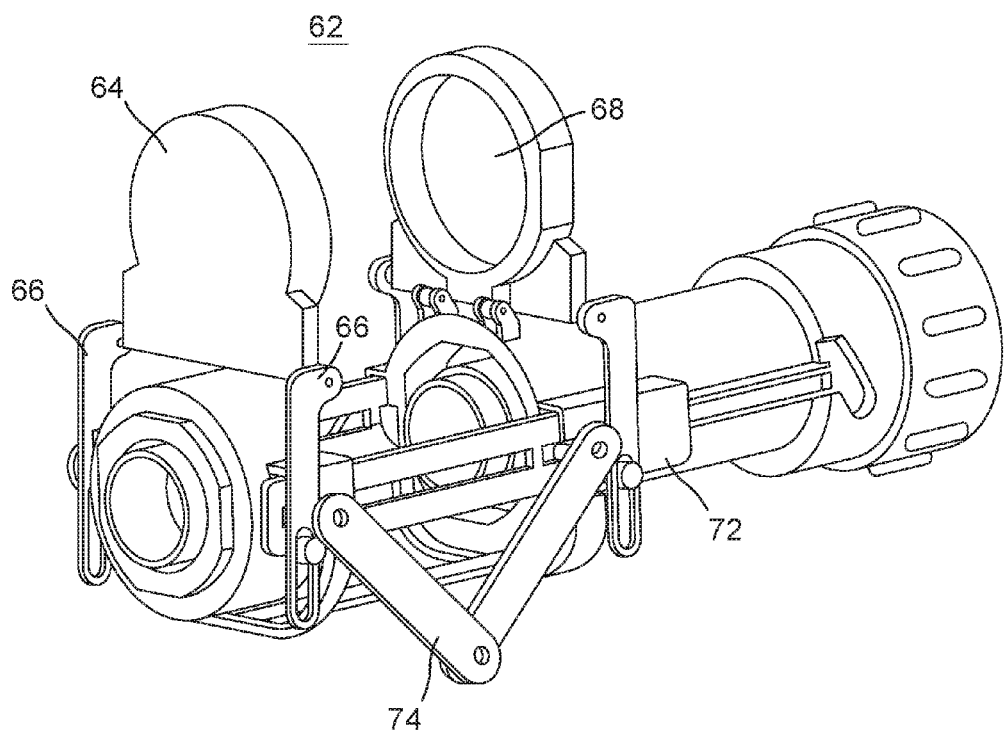
Figure 2I:
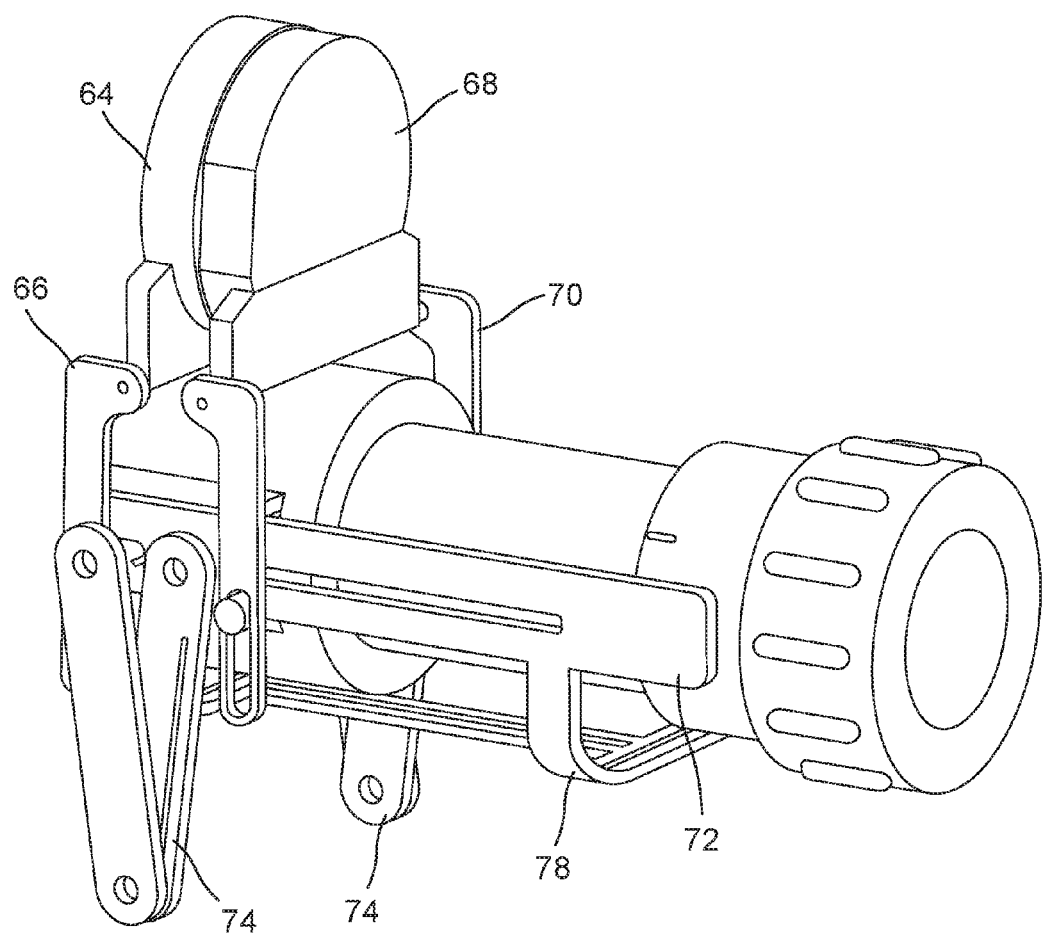
Figure 2J:
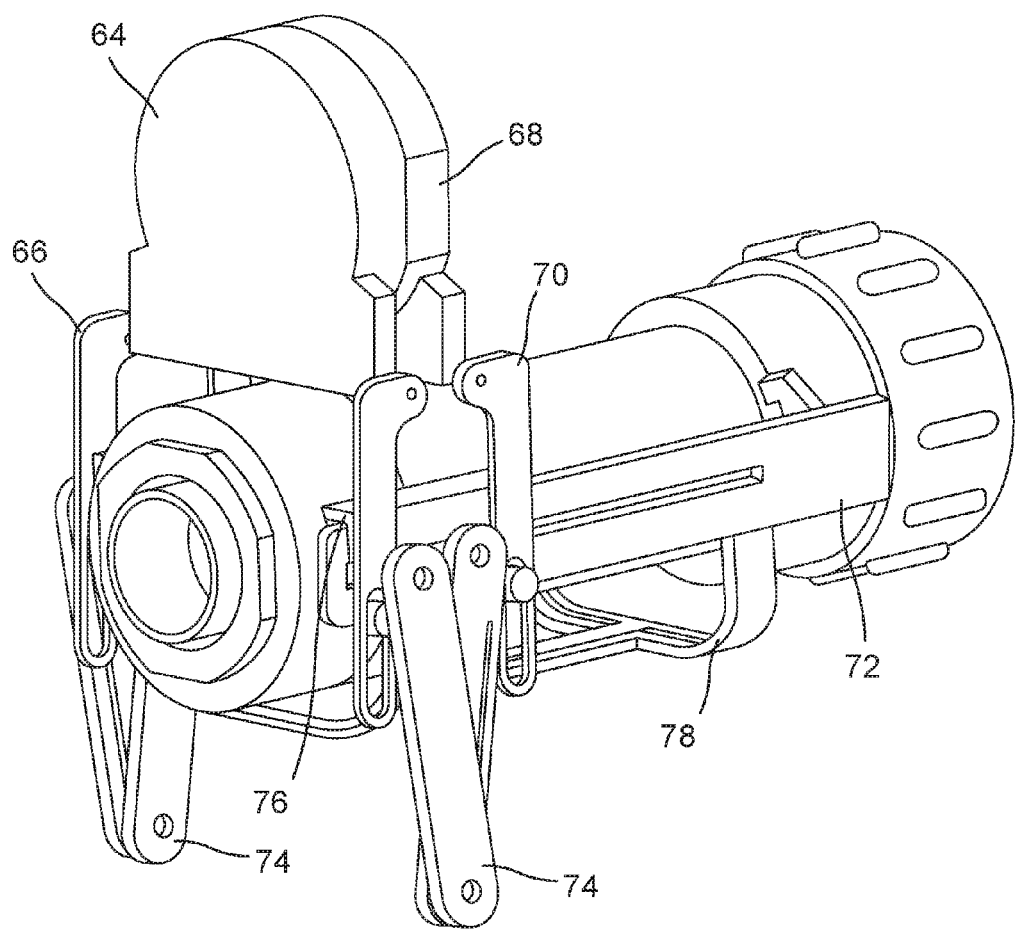

FIGS. 2F-2J show yet another example of a set of housings 62 (62a, 62b) that may be used to couple a corresponding pair of connectors to one another in an environment containing dust and/or other debris. A first housing 62*a* may have an open end and one or more surfaces defining a first cavity to receive/contain a first connector. The first housing 62*a* may also include a first cap 64 coupled to the first housing 62*a*, wherein the first cap 64 is movable between a closed position (e.g., as shown in FIGS. 2F and 2G) in which the open end of the first housing 62*a* is covered by the first cap 64 and an open position (e.g., as shown in FIGS. 2H-2J) in which the open end of the first housing 62*a* is not covered by the first cap 64. In addition, a first hinge 66 may be coupled to the first housing 62*a* and the first cap 64, wherein the first hinge 66 inverts the first cap 64 between the closed position and the open position. In the illustrated example, the first hinge 66 includes a two-piece configuration in which each piece has an oblong slot that rides along a pin protruding from the side of the first housing 62*a*.

Similarly, a second housing 62*b* may include an open end and one or more surfaces defining a second cavity to receive/contain a second connector. The illustrated second housing 62*b* also includes a second cap 68 coupled to the second housing 62*b* and a second hinge 70 coupled to the second housing 62*b* and the second cap 68, wherein the second hinge 70 inverts the second cap 68 between the closed position and the open position. In the illustrated example, the second hinge 70 also includes a two-piece configuration in which each piece has one or more surfaces defining an oblong slot that rides along a pin protruding from the side of the second housing 62*b*.

In one example, a plurality of side rails 72 are coupled to the exterior of the first housing 62*a*, wherein each side rail 72 includes one or more surfaces defining a longitudinal slot. Additionally, the apparatus 62 may include a plurality of dual-member linkages 74, wherein each dual-member linkage 74 rests in a longitudinal slot of a corresponding side rail 72 and forces the first and second caps 64, 68 open when the second housing 62*b* is mated with the plurality of side rails 72 (e.g., as best shown in FIGS. 2G and 2H). In this regard, the second housing 62*b* may include a plurality of side channels 76 (e.g., as best shown in FIG. 2J) through which the side rails slide during mating and de-mating. The first housing 62*a* may also include a frame 78 extending between the side rails 72 and around the first housing 62*a* to provide structural support to the side rails 72 (e.g., particularly at their distal ends). As best shown in FIGS. 2I and 2J, when the open end of the first housing 62*a* and the open end of the second housing 62*b* are coupled to one another, the first cap 64 and the second cap 68 may seal one another.

Rotating End Caps

Figure 3A:
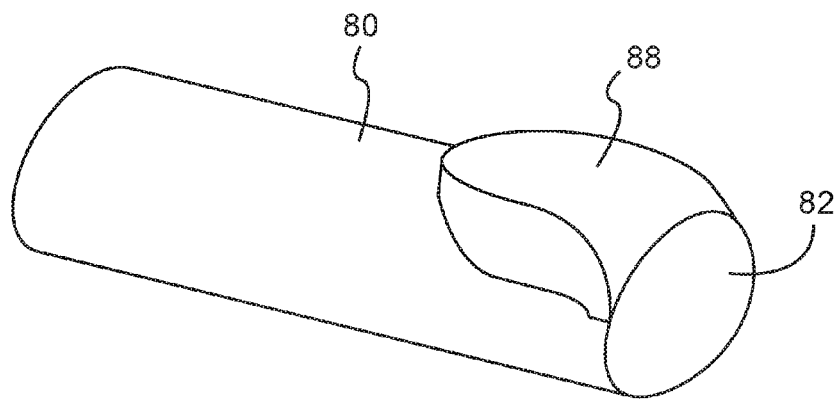
FIGS. 3A-3G show isometric and side views of an example of an apparatus having a rotating end cap configuration according to an embodiment.
Figure 3B:
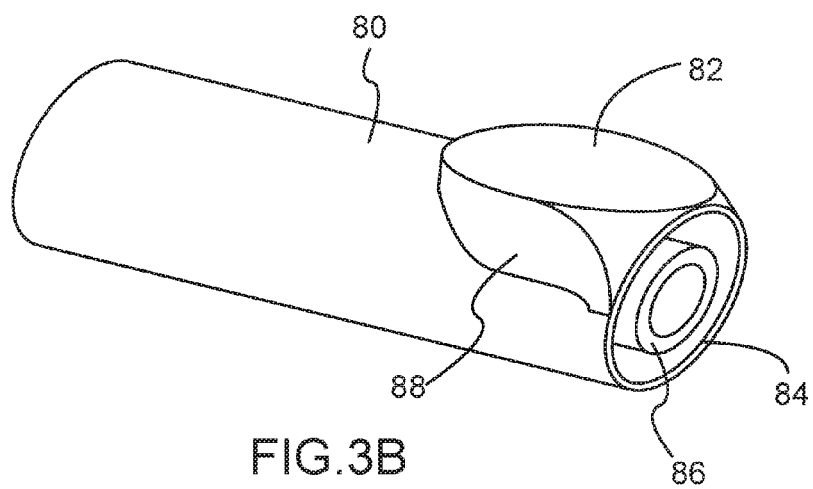
Figure 3C:
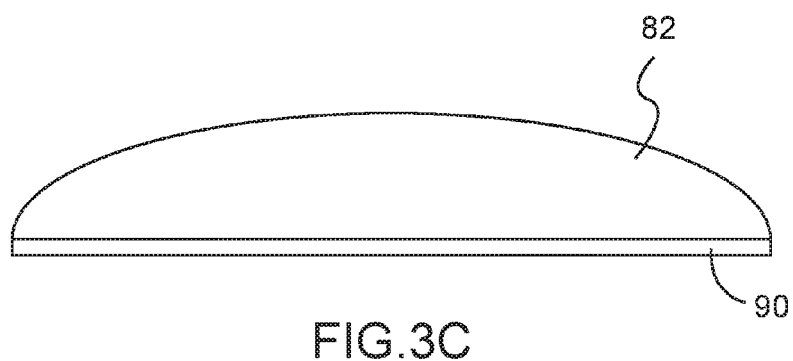
Figure 3D:
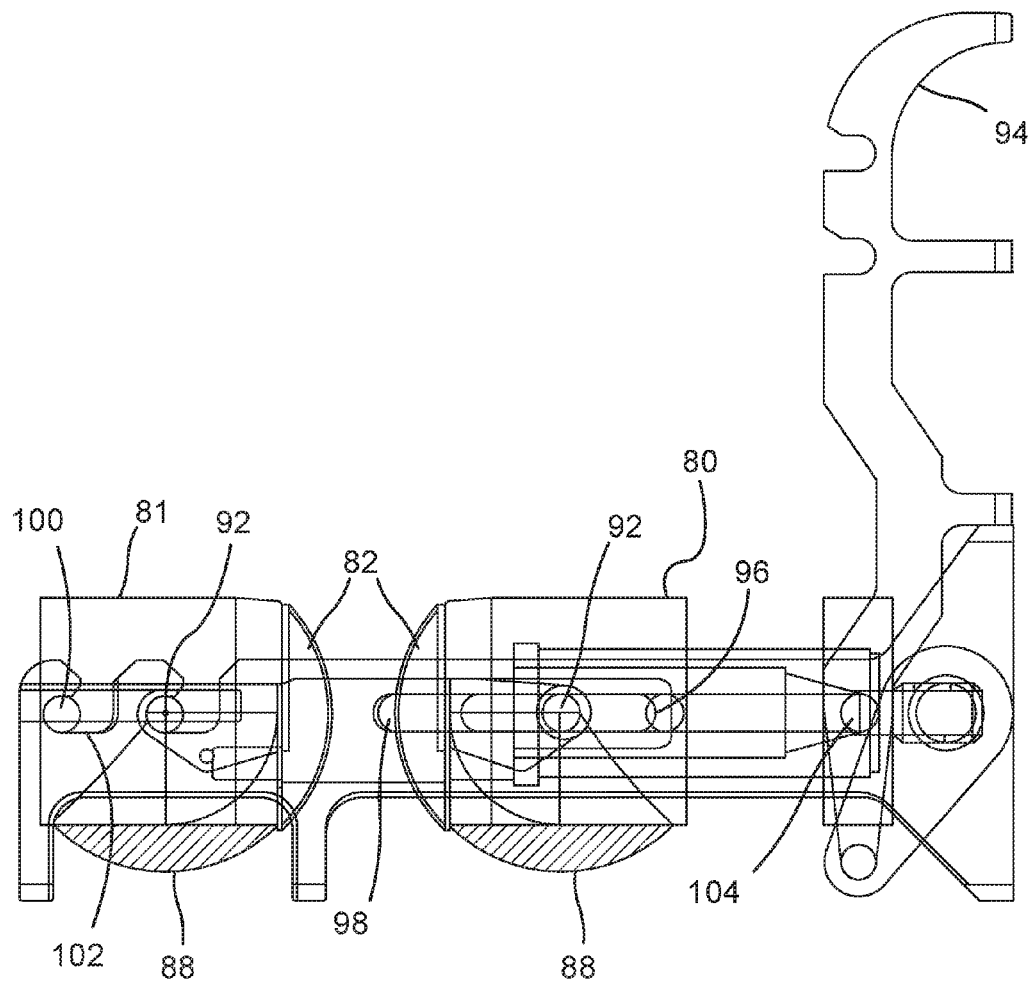
Figure 3E:
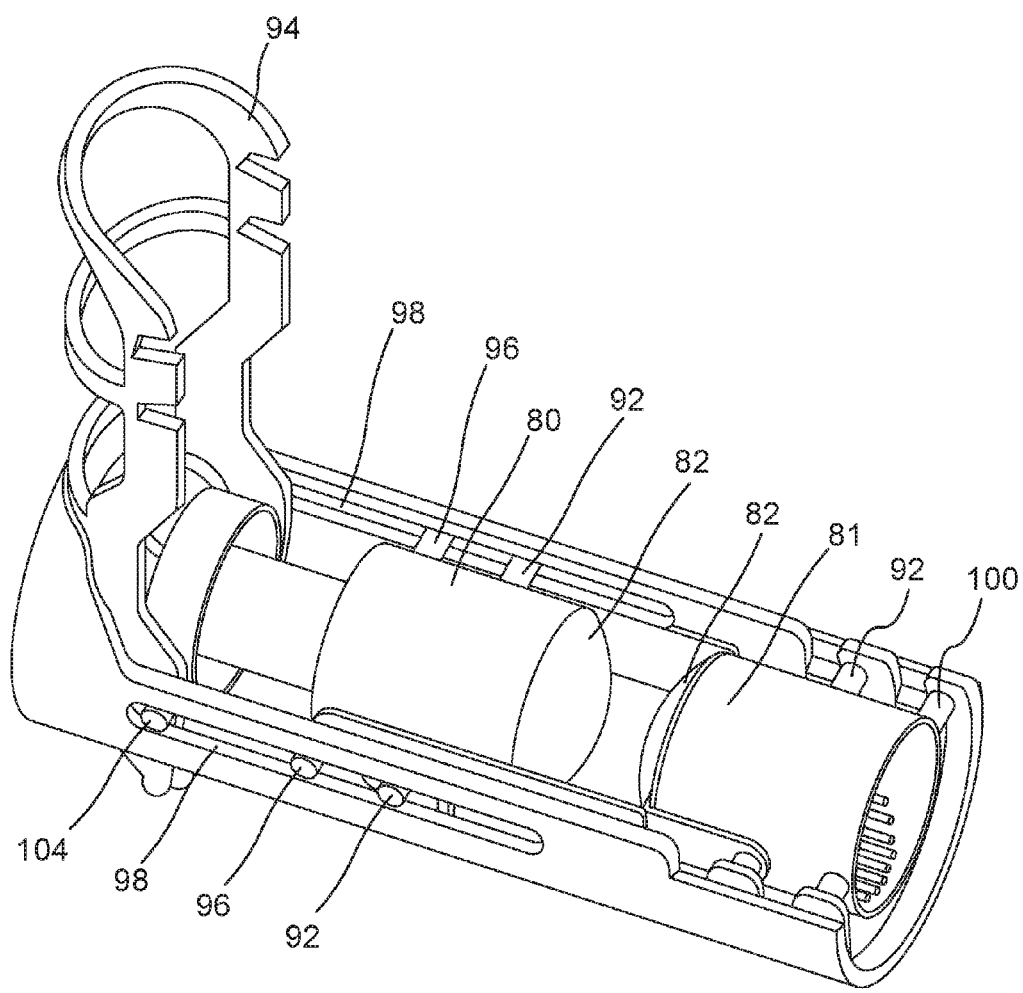
Figure 3F:
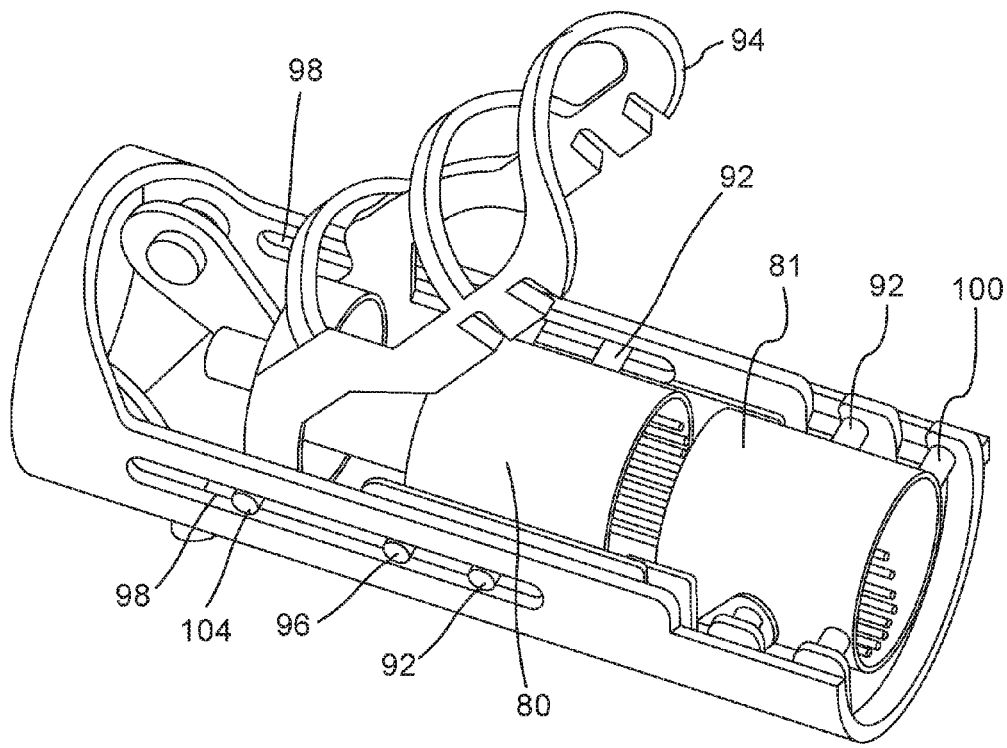
Figure 3G:
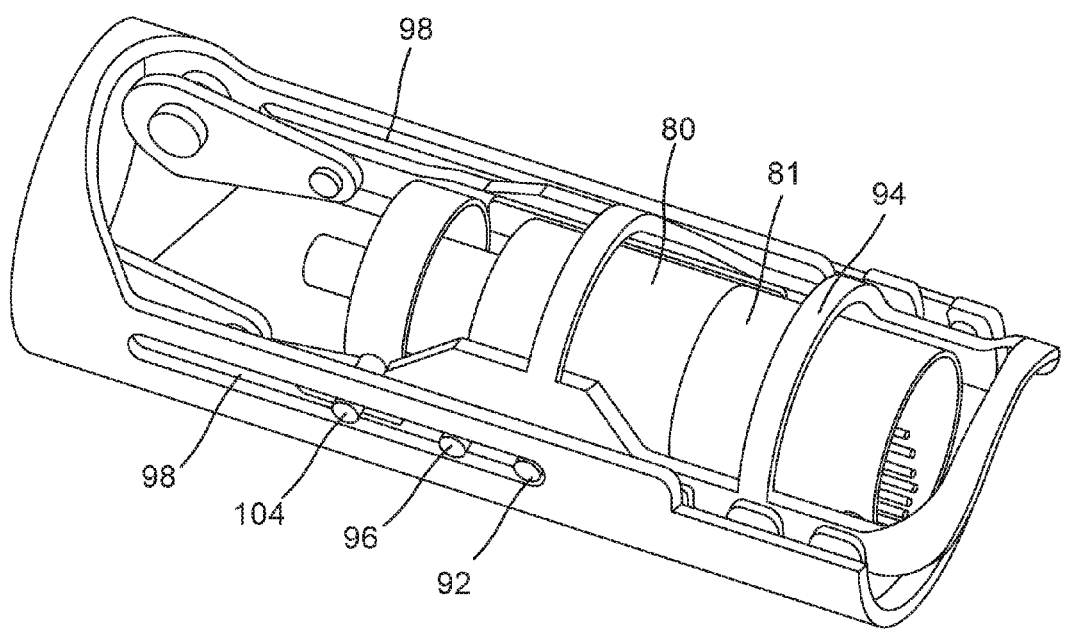

Turning now to FIGS. 3A-3G, a first housing 80 having an open end 84, one or more surfaces defining a cavity to receive/contain a connector 86, and a rotatable cap 82 is shown. More particularly, FIG. 3A demonstrates that the cap 82 covers the open end 84 of the first housing 80 in the closed position and FIG. 3B demonstrates that the cap 82 does not cover the open end 84 of the first housing 80 in the open position. Moreover, a side piece 88 may be coupled to the external surface of the first housing 80, wherein the cap 82 includes a wiper 90 (e.g., sealing and/or doctoring blade, as best shown in FIG. 3C) positioned on the underside of the cap 82. The wiper 90 may brush against the external surface of the side piece 88 as the cap 82 rotates to the open position. The illustrated wiper 90 also seals the open end 84 of the first housing 80 when the cap 82 is in the closed position. As best shown in FIGS. 3D-3G, a set of pins 92 may extend from opposing sides of the first housing 80 and define an axis, wherein the cap 82 is coupled to the first housing 80 via the set of pins 92, and wherein the cap 82 is rotatable about the axis defined by the set of pins 92.

Additionally, a pair of housings 80, 81 may be used, wherein the open ends 84 of the housings 80, 81 mate with one another to form an electrical, fluid and/or gas connection. Thus, a second housing 81 may also have surfaces defining a cavity to receive/contain a connector and a cap 82 coupled to the second housing 81, wherein the cap 82 is rotatable between the closed position and the open position. In the illustrated example, an actuator assembly is used to form the connection between the housings 80, 81 and their respective connectors. More particularly, the actuator assembly may include an actuator arm 94 and one or more surfaces that define a cavity to receive/contain the first and second housings 80, 81. Moreover, the actuator arm 94 may be coupled to the first housing 80 and move the first housing 80 longitudinally within the cavity of the actuator assembly during transitions of the caps 82 between the closed position and the open position.

In one example, a first set of pins 96 extend from opposing sides of the first housing 80, wherein the actuator assembly further includes one or more surfaces defining a plurality of longitudinal slots 98 to receive the first set of pins 96 and guide the first housing 80 longitudinally within the third cavity during transitions of the caps 82 between the closed position and the open position. Additionally, a second set of pins 100 may extend from opposing sides of the second housing 81, wherein the actuator assembly further includes one or more surfaces defining a plurality of stabilizing slots 102 (e.g., best shown in FIG. 3D) to receive the second set of pins 100. The illustrated actuator assembly further includes a third set of pins 104 extending from opposing sides of the second housing 81, wherein the plurality of longitudinal slots 98 receive the third set of pins 104 and guide the actuator arm 94 longitudinally during transitions of the caps 82 between the closed position and the open position.

Poppet Valves

FIGS. 4A-4E show a debris exclusion and removal apparatus 106 having a male connector 108 and a female connector 110. More particularly, FIGS. 4A-4E sequentially demonstrate a mating process between the male connector 108 and the female connector 110. In the illustrated example, the male connector 108 includes a first poppet valve 112 positioned between an inlet end of the male connector 108 and a first chamber 114 of the male connector 108. More particularly, the first poppet valve 112 may include a plunger that is spring loaded against a stationary piece by virtue of a spring 124. The female connector 110 may include a second poppet valve 116 positioned between an outlet end of the female connector 110 and a second chamber 118 of the female connector 110, wherein a third poppet valve 120 may be positioned between the second chamber 118 and a third chamber 122 of the female connector 110. The illustrated third poppet valve 120 includes a plunger that is spring loaded against the outer shell of the female connector 110 (e.g., a stationary piece) by virtue of a spring 126.

Figure 4A:
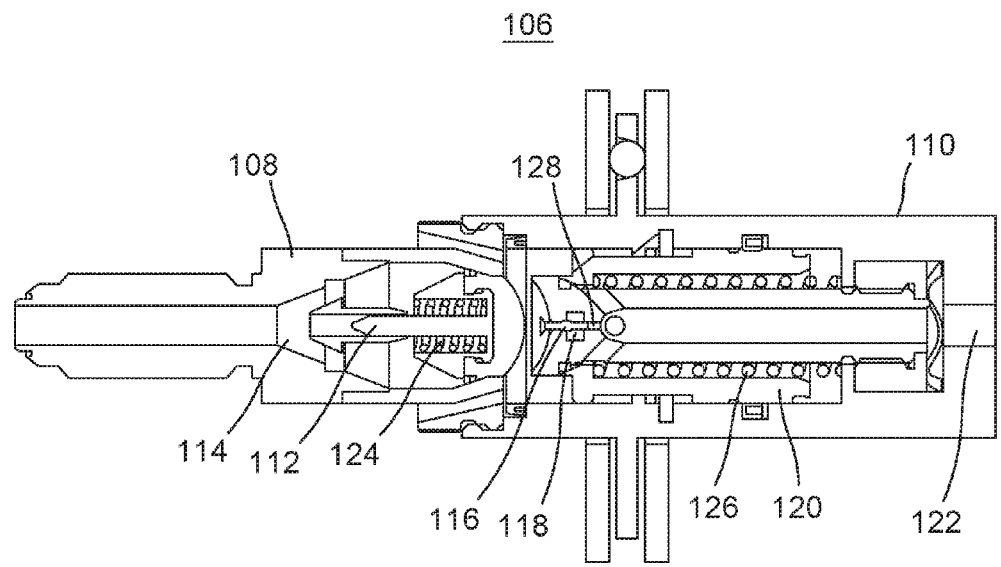
FIGS. 4A-4E show sectional views of an example of an apparatus having a poppet valve configuration according to an embodiment.
Figure 4B:
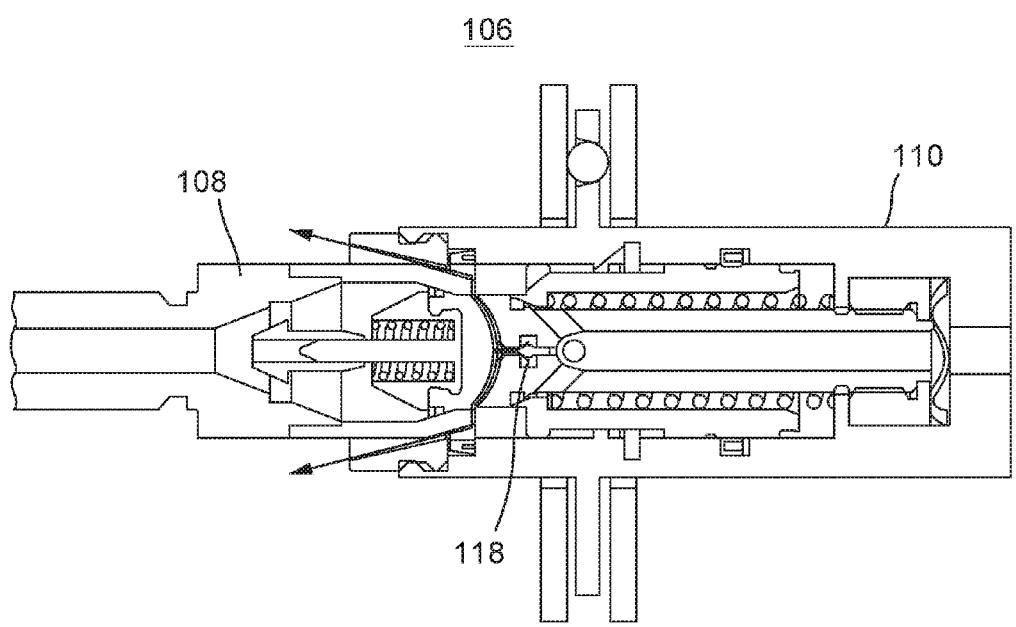
Figure 4C:
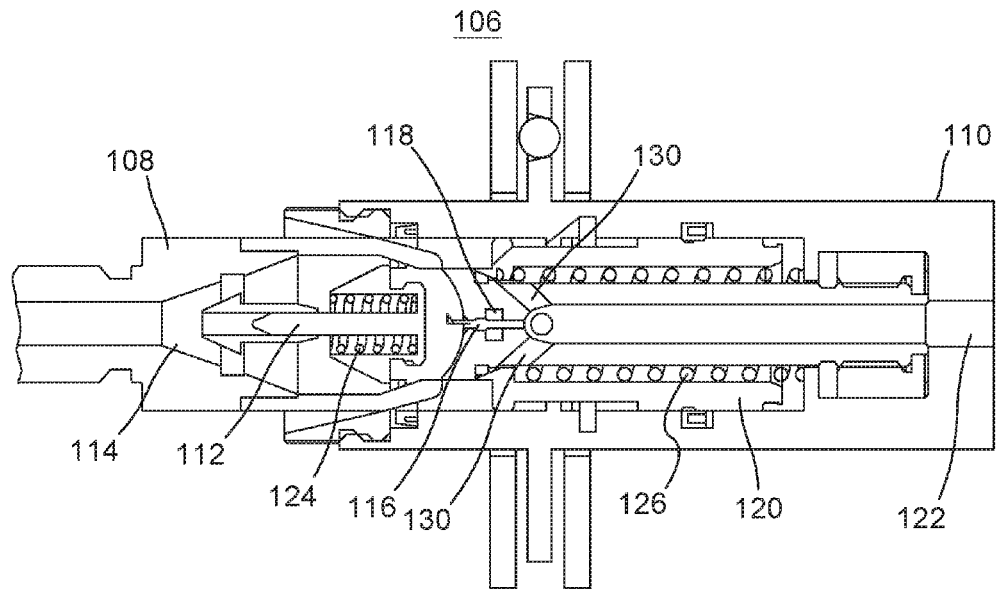

In general, when the inlet end of the female connector 110 is coupled to a source (not shown) of a pressurized substance (e.g., oxygen, hydrogen, nitrogen), the third chamber 122 supplies the second chamber 118 with the pressurized substance during a "charging stage." In this regard, the third poppet valve 120 may include one or more surfaces defining a secondary substance path 128 to supply the second chamber 118 with the pressurized substance during the charging stage. As shown in FIG. 4B, when the second chamber 118 contains the pressurized substance, coupling the male connector 108 to the female connector 110 causes the pressurized substance in the second chamber 118 to clean the inlet end of the male connector 108 (e.g., following the path of the arrows). Moreover, when the second chamber 118 contains the pressurized substance, decoupling the male connector 108 from the female connector 110 causes the pressurized substance in the second chamber 118 to clean the inlet end of the male connector 108.

Figure 4D:
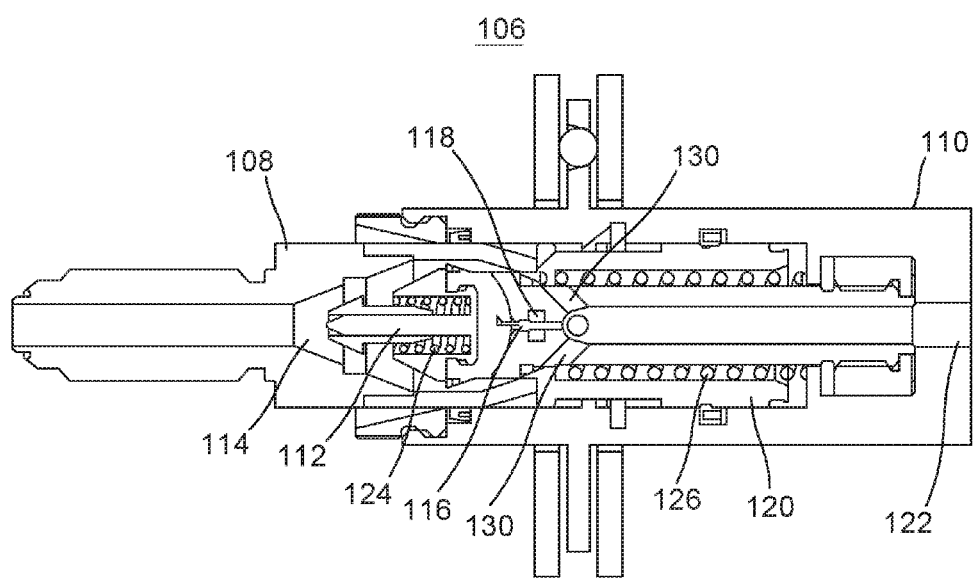
Figure 4E:
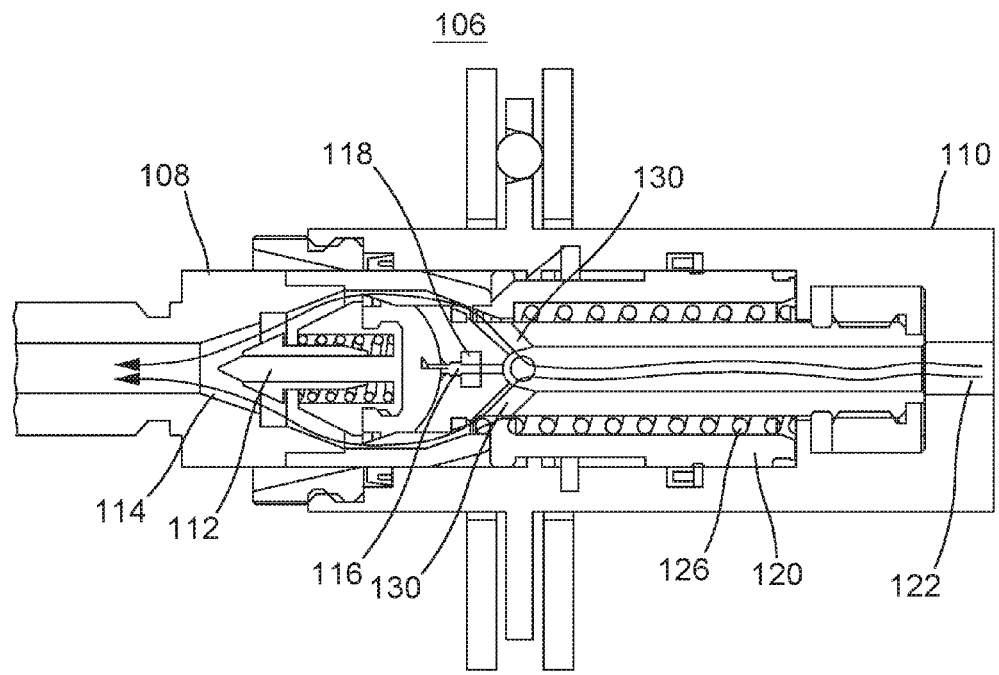

As best shown in FIG. 4E, the third poppet valve 120 includes one or more surfaces defining a primary substance path 130 to supply the male connector 108 with the pressurized substance during a "supply stage" (e.g., following the path of arrows). In one example, the third poppet valve 120 has an actuation force that is greater than the actuation force of the first poppet valve 112 and the second poppet valve 116. As a result, the illustrated order of activation is the second poppet valve 116 (e.g., as shown in FIG. 4B), then the first poppet valve 112 (e.g., as shown in FIG. 4D), and then third poppet valve 120 (e.g., as shown in FIG. 4E). In general, the second and third chambers 118, 122 may maintain the transferred substance at a relatively high pressure (e.g., 3800 psi), whereas the first chamber 114 may maintain the transferred substance at a relatively low pressure (e.g., 200 psi).

O-Rings

Figure 5A:
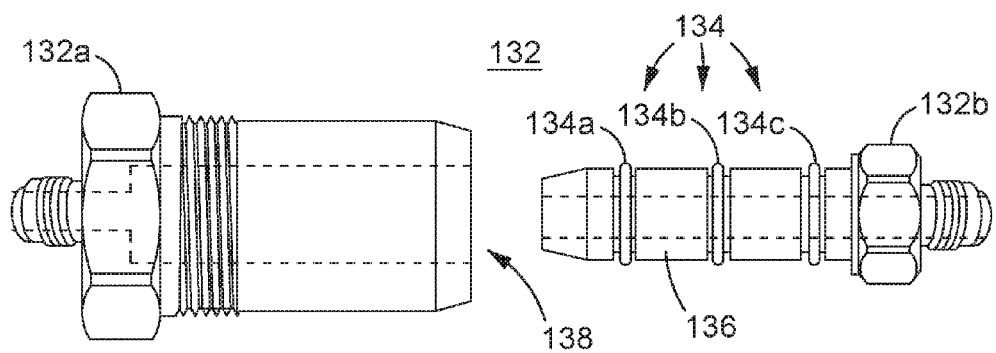
FIGS. 5A and 5B show side views of an example of an apparatus having an O-ring configuration according to an embodiment.
Figure 5B:
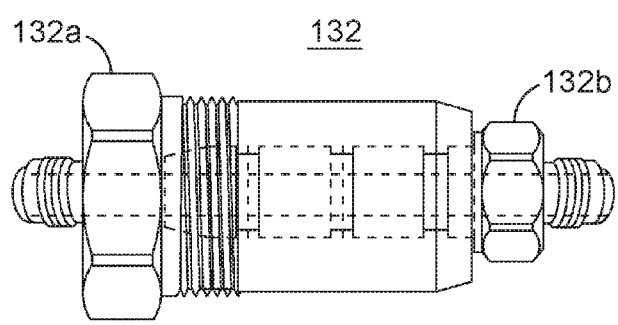

FIGS. 5A and 5B show a debris exclusion and removal apparatus 132 (132a, 132b) in a de-mated configuration (FIG. 5A) and a mated configuration (FIG. 5B). In the illustrated example, a female connector 132a has a bore 138 (e.g., an elongated configuration) and a male connector 132b has a shaft 136 (e.g., an elongated configuration) that mates with the bore 138 of the female connector 132a. A plurality of O-rings 134 (134a-134c) may be positioned along either one of the shaft 136 or the bore 138. The O-rings 134 may generally clean the interior of the apparatus 132 during mating and de-mating, as well as form a longitudinal seal along the apparatus 132 while the male connector 132b remains coupled to the female connector 132a. Indeed, the longitudinal seal, which may have a length that is substantially equal to an entire length of the bore 138, may maintain the interior of the apparatus 132 in a clean state.

In the illustrated example, the plurality of O-rings 134 includes a pair of O-rings 134a, 134c positioned at opposing ends of the apparatus 132 and a third O-ring 134b positioned approximately mid-way between the pair of O-rings 134a, 134b. Such a configuration may ensure that at least two of the O-rings 134 engage and wipe the surface being cleaned as the male connector 132b passes through the female connector 132a. The illustrated shaft 136 of the male connector 132b includes a corresponding plurality of grooves in which the plurality of O-rings 134 sit. In such a case, the O-rings 134 clean the bore 138 of the female connector 132a when the male connector 132b is either being coupled to or decoupled from the female connector 132a. Alternatively, the bore 138 of the female connector 132a may include a corresponding plurality of grooves in which the plurality of O-rings 134 sit, wherein coupling the male connector 132b to, or decoupling the male connector 132b from, the female connector 132a causes the O-rings to clean the shaft 136 of the male connector 132b.

Filament Barriers

Figure 6A:
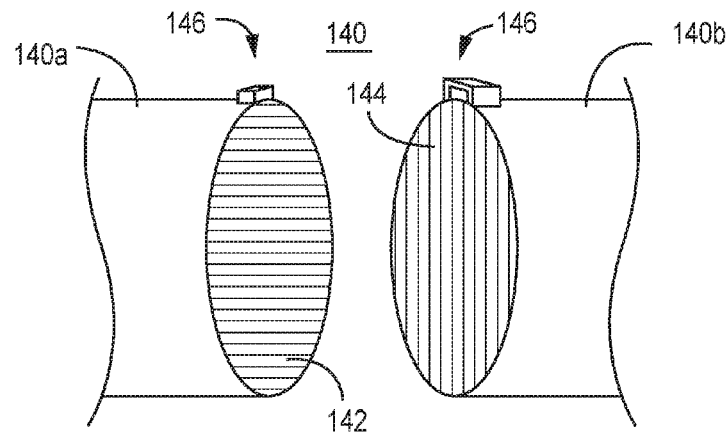
FIGS. 6A-6C show side views of examples of apparatuses having a filament barrier configuration according to embodiments.
Figure 6B:
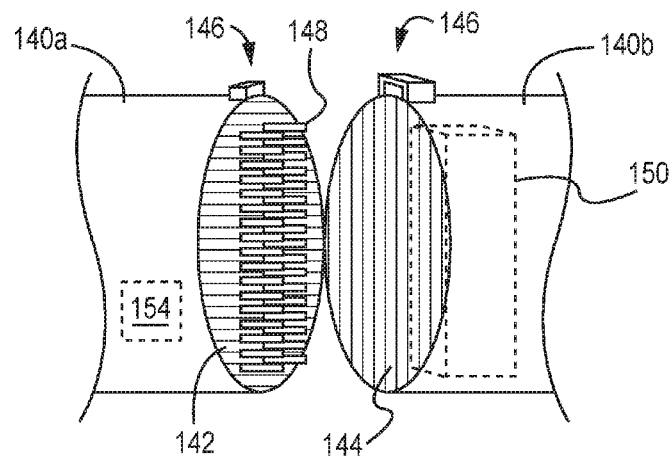
Figure 6C:
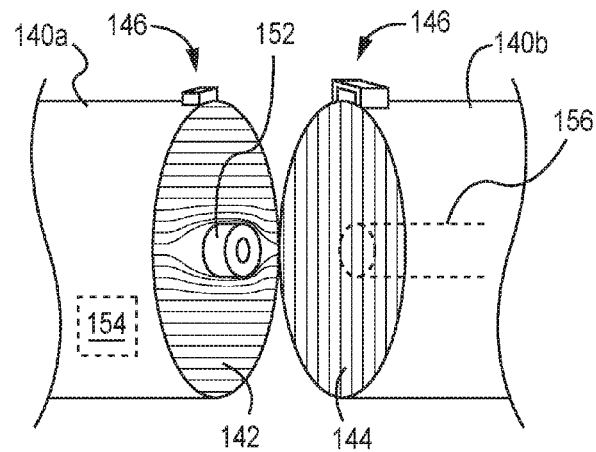

FIGS. 6A-6C show debris exclusion and removal apparatuses that may be used to transfer substances and/or electrical current in dusty and/or otherwise unclean environments. For example, FIG. 6A shows an apparatus 140 (140a, 140b) having a first housing 140a with an open end and a first columnar array of filaments 142 extending across the open end of the first housing 140a. The first housing 140a may also include a first connector positioned within the first housing 140a, wherein the first columnar array of filaments 142 are spaced closely enough together to prevent dust particles and other debris from reaching the interior of the first housing 140a and contaminating the first connector (e.g., a clean state).

The illustrated apparatus 140 also includes a second housing 140b having an open end and a second columnar array of filaments 144 extending across the open end of the second housing 140b. A second connector may be positioned within the second housing 140b, wherein an alignment system 146 may arrange the first columnar array of filaments 142 at a non-zero angle (e.g., 90°, 45°, etc.) with respect to the second columnar array of filaments 144 when the first housing 140a is coupled to the second housing 140b. Similarly, the second columnar array of filaments 144 may be spaced closely enough together to maintain the interior of the second housing 140b in a clean state. The first and second columnar arrays of filaments 142, 144 may be made of any material having an elastic response with no hysteresis (e.g., thread, rubber, TEFLON, etc.). Additionally, more than two arrays of filaments may be used, depending upon the circumstances.

FIG. 6B demonstrates that the first connector may include an electrical connector having one or more pins 148 that are cleaned by the first and second columnar arrays of filaments 142, 144 when the pins 148 are extended and mated with a corresponding socket 150 in the second housing 140b. FIG. 6C demonstrates that the first connector may also include a fluid connector (e.g., for liquid and/or gas) having one or more male mating surfaces 152 that are extended and cleaned by the first and second columnar arrays of filaments 142, 144 after the first housing 140a is coupled to the second housing 140b and the one or more male mating surfaces 152 are mated with one or more corresponding female mating surfaces 156 in the second housing 140b. In either instance, an actuation system 154 may force the pins 148 and/or the male mating surfaces 152 through the first and second columnar arrays of filaments 142, 144 after the first housing 140a is coupled to the second housing 140b. The actuation system 154 may be electrical, mechanical, hydraulic, pneumatic, etc., and may be controlled remotely or locally at the apparatus 140.

Retractable Covers

Figure 7G:
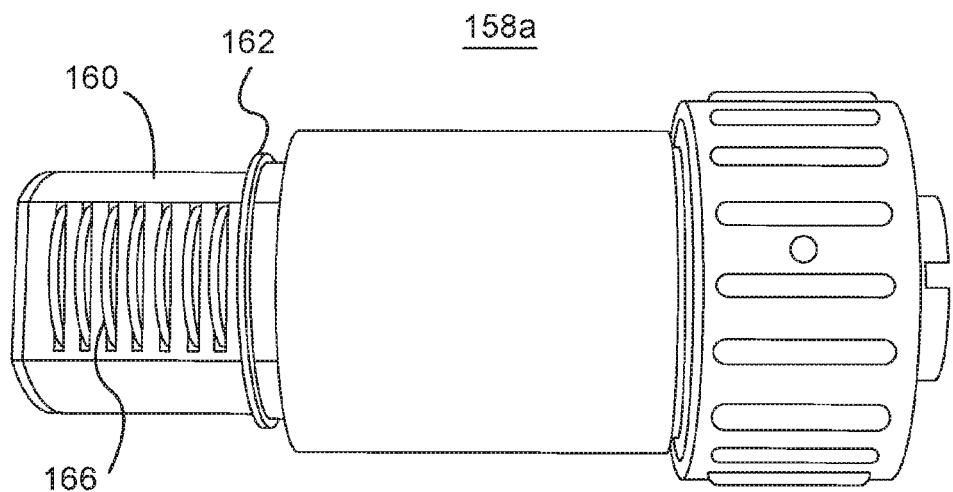

FIGS. 7A-7H show a debris exclusion and removal apparatus 158 (158a, 158b, e.g., a "blade connector") that may be used to transfer electrical current in a dusty and/or otherwise unclean environment. In the illustrated example, a first connector 158a has a male member 160 with a first retractable cover 162 (e.g., spring loaded) positioned about the exterior of the male member 160 (as best shown in FIG. 7G, with the cover forced open). Additionally, a second connector 158b may include a female member having a second retractable cover 164 (e.g., spring loaded) positioned within the interior of the female member. In one example, an internal dust trapping feature of the illustrated blade connector may be provided against the surfaces perpendicular to the longitudinal axis of the apparatus 158. More particularly, the internal dust trapping feature may prevent contamination from rapidly propagating throughout the internal mechanisms of the apparatus 158. Thus, dust does not propagate throughout the apparatus 158 on a first use, in the illustrated example.

The male member 160 may have an outer diameter that is greater than the inner diameter of the second retractable cover 164 so that the male member 160 retracts the second retractable cover 164 when the first and second connectors 158a, 158b are coupled to one another. Similarly, the female member may have an inner diameter that is less than the outer diameter of the first retractable cover 162 so that the female member retracts the first retractable cover 162 when the first and second connectors 158a, 158b are coupled to one another. As previously stated, the coupling of the first and second connectors 158a, 158b of the apparatus 158 traps (i.e., sandwiches) any dust or other contaminants internally between the mated surfaces of the first and second retractable covers 162, 164.

Figure 7H:
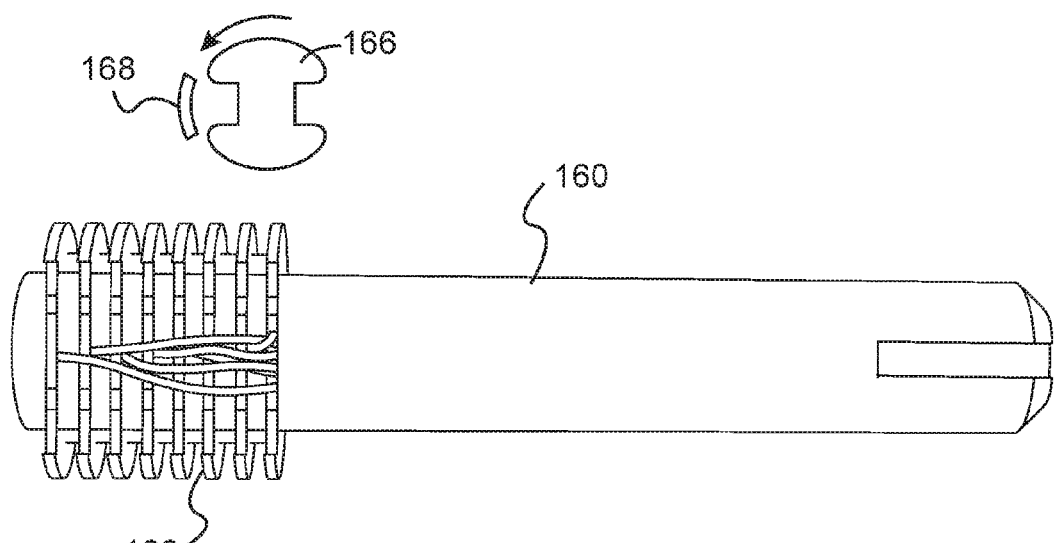
Figure 11B:
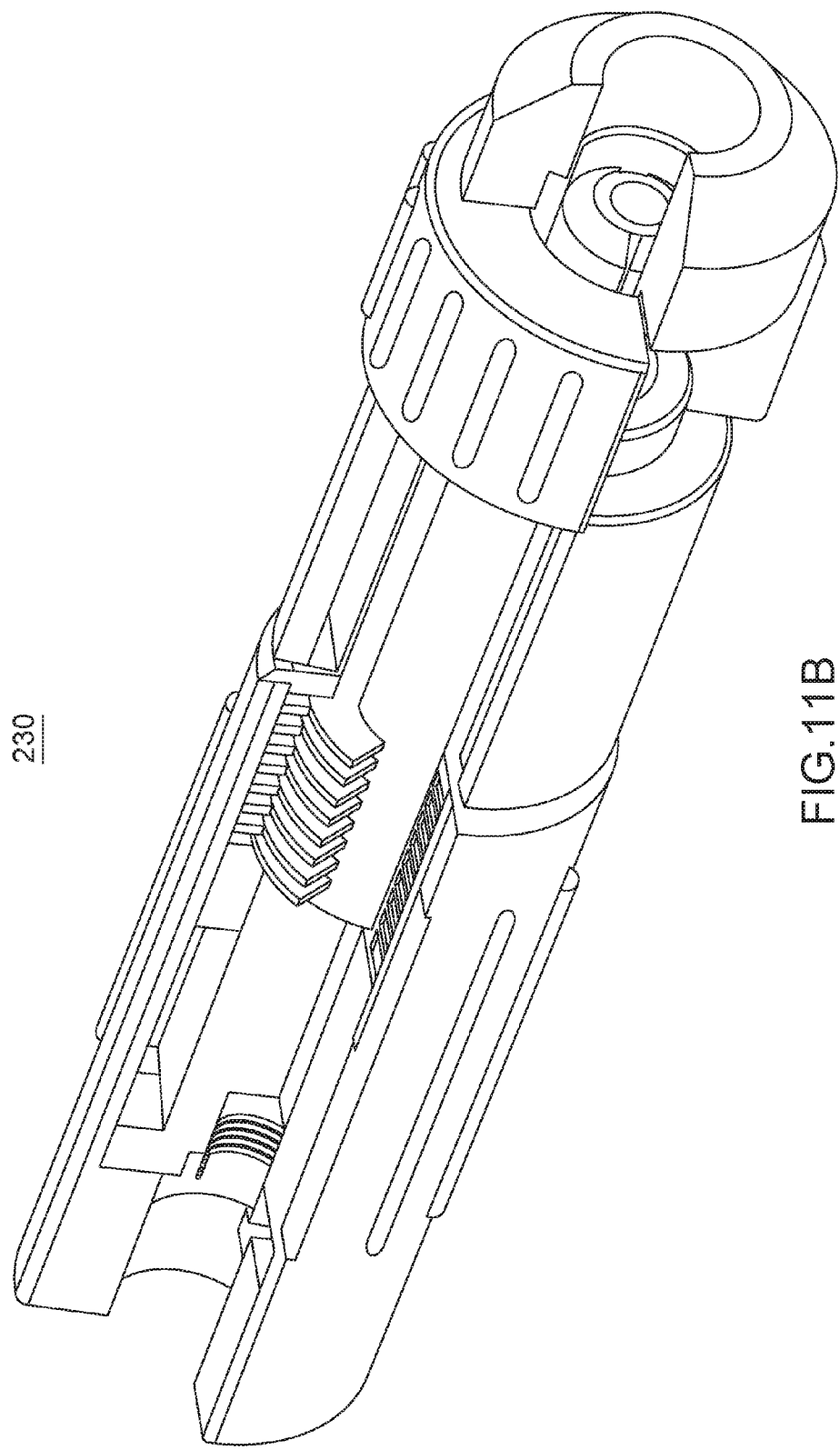
Figure 11C:
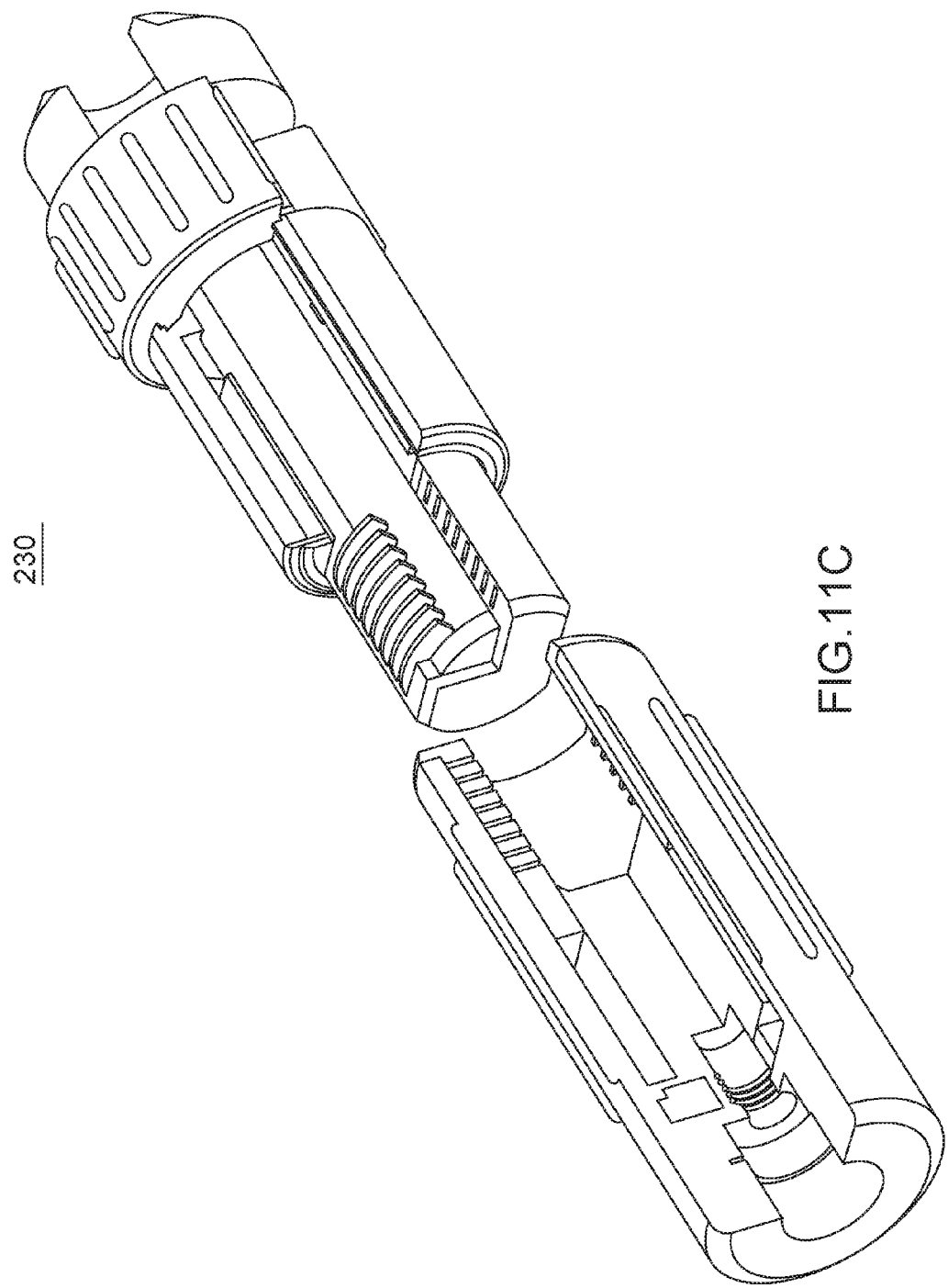
Figure 11D:
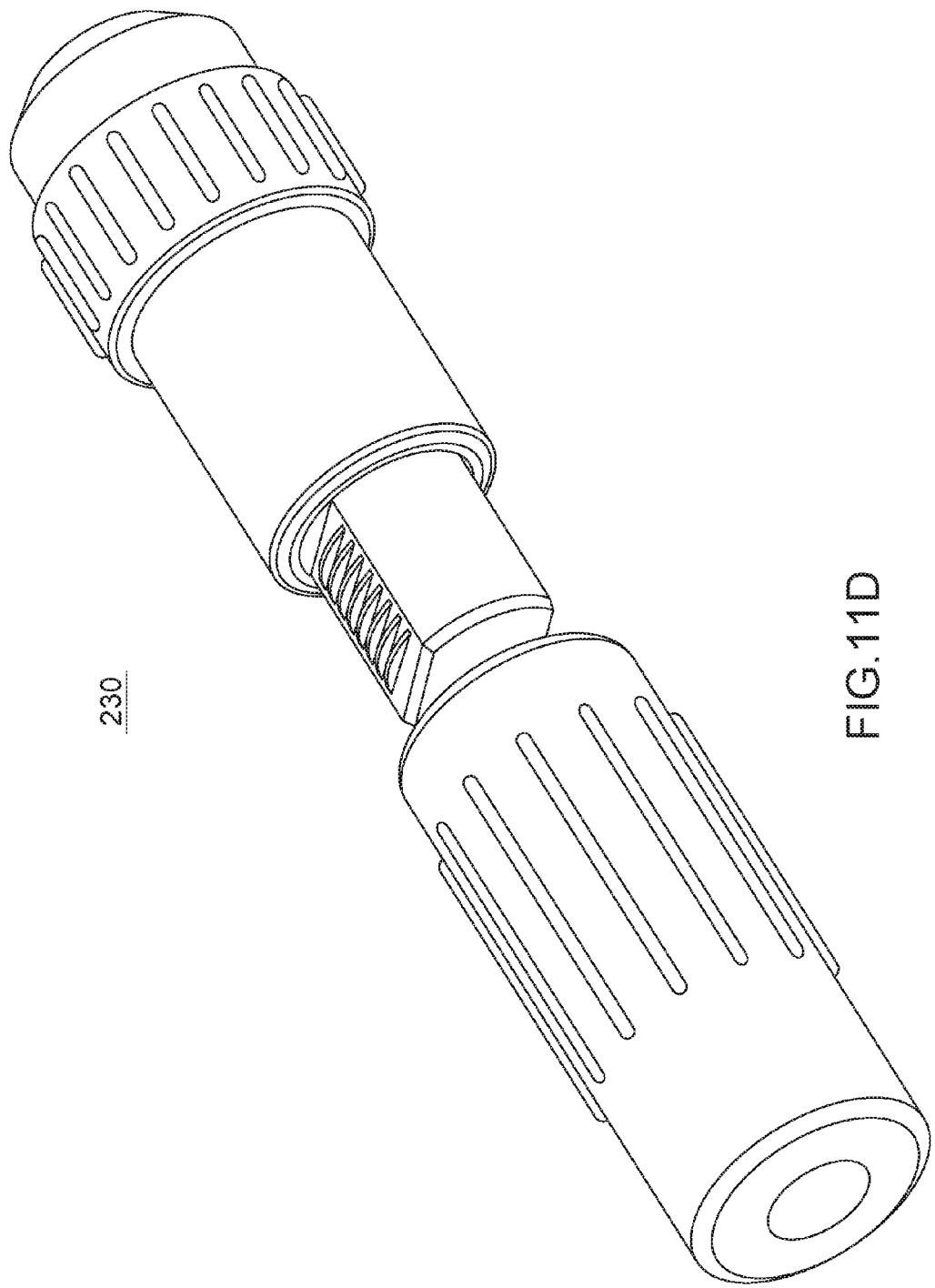

As best shown in FIGS. 7G and 7H, the first connector 158a may include a plurality of wafers 166 positioned along the male member 160, wherein each wafer may have a non-uniform shape (e.g., winged shape). Moreover, the male member 160 and the second retractable cover 164 may have chamfered cross sections (e.g., best shown in FIG. 7G, the end view of FIG. 7E, and FIG. 11A) that mate with one another (e.g., providing a keyed connection). In such a case, rotation of the first connector 158a within the second connector 158b during the coupling process may force the plurality of wafers 166 to protrude from the male member 160. Additionally, the female member may include a plurality of contacts 168 positioned to align with the plurality of wafers when the first connector 158a is coupled to the second connector 158b. Accordingly, the wiping motion between the wafers 166 and the contacts 168 may improve continuity by removing any oxides that may be present.

FIGS. 11A-11D show a debris exclusion and removal apparatus 230 having a retractable cover configuration according to additional embodiments of the present invention.

Additional Embodiments—Clamshell End Cap

Figure 8A:
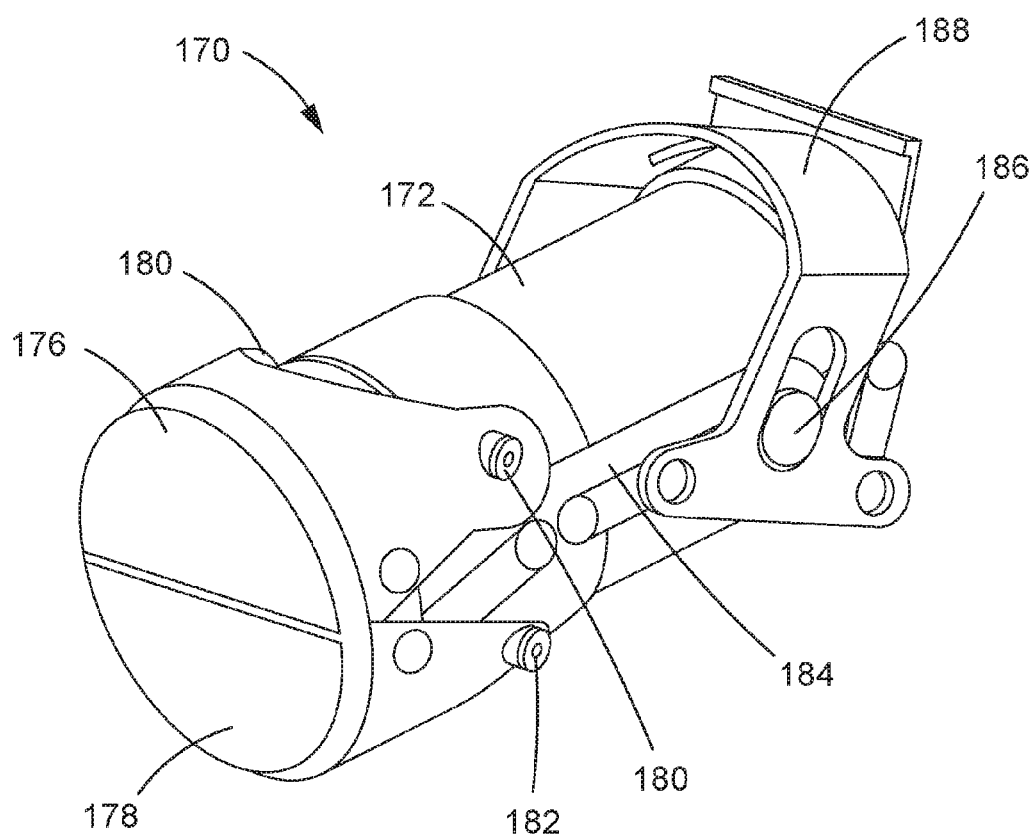
FIGS. 8A and 8B show isometric views of an example of a clamshell configuration according to an embodiment.
Figure 8B:
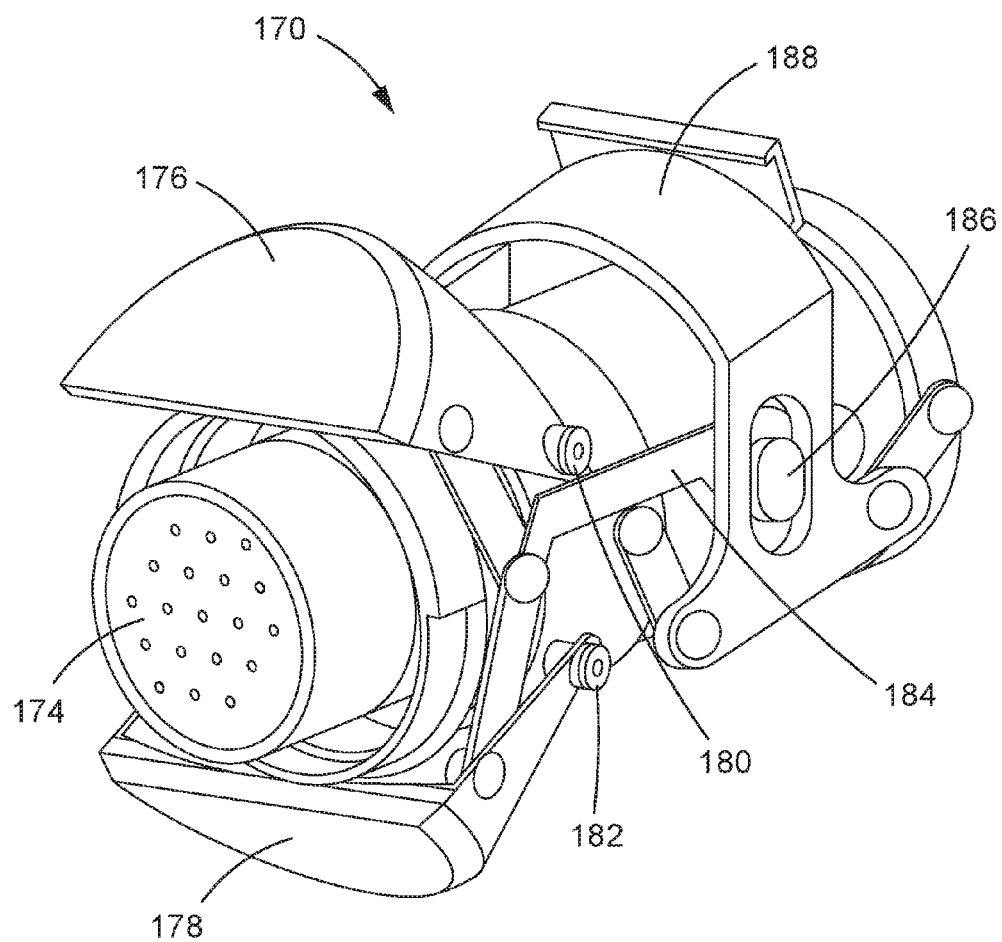

FIGS. 8A and 8B show a debris exclusion and removal apparatus 170 having a clamshell configuration. More particularly, the apparatus 170 may include a housing 172 having an open end and one or more surfaces defining a first cavity to receive a first connector 174. The illustrated apparatus 170 also includes a first cap segment 176 coupled to the housing 172, wherein the first cap segment 176 is movable between a first closed position (as shown in FIG. 8A) in which a first portion (e.g., top half) of the open end is covered by the first cap segment 176 and a first open position in which the first portion of the open end is not covered by the first cap segment 176. Similarly, a second cap segment 178 may be coupled to the housing 172, wherein the second cap segment 178 is also movable between a second closed position in which a second portion (e.g., bottom half) of the open end is covered by the second cap segment 178 and a second open position in which the second portion of the open end is not covered by the second cap segment 178. Thus, placing the cap segments 176, 178 in their respective closed positions may enable the apparatus 170 to prevent dust and other debris from coming in contact with the connector 174.

In one example, a first hinge configuration 180 is coupled to the housing 172 and the first cap segment 176, and a second hinge configuration 182 is coupled to the housing 172 and the second cap segment 178. Moreover, the apparatus 170 may also include a set of spreader members 184, wherein each spreader member 184 has a first extremity coupled to the first cap segment 176, a second extremity coupled to the second cap segment 178, and a third extremity coupled to the housing 172. In the illustrated example, each spreader member 184 forms a Y-shape (as shown in FIG. 8B) when the first cap segment 176 is in the first open position and the second cap segment 178 is in the second open position. Although only one spreader member 184 is visible in the views shown, the apparatus 170 may include a pair of spreader members 184 positioned on opposite sides of the housing 172.

Additionally, a set of pins 186 may extend laterally from an exterior of the housing 172, wherein a rotatable sleeve 188 (e.g., having a large handle) may be coupled to the exterior of the housing 172. Although only one pin 186 is visible in the views shown, the apparatus 170 may include a pair of pins 186 positioned on opposite sides of the housing 172. In the illustrated example, each pin 186 is coupled to the rotatable sleeve 188 and one of the third extremities of the spreader members 184. Moreover, the rotatable sleeve 188 is coupled to the exterior of the housing 172 via a set of rotatable linkage members in the example shown. Thus, rocking the rotatable member 188 forward may cause the cap segments 176, 178 to part and enable the connector 174 to be mated with another connector (not shown).

In an additional embodiment of the clamshell end cap configuration, an existing off-the-shelf (COTS) connector (e.g., Amphenol® Astronaut Zero-G Connector) is adapted for use in dusty and/or contaminated environments as a debris exclusion and removal apparatus. More specifically the clamshell cap segments 176, 178 are coupled to an existing COTS connector housing in a manner similar to what has previously been described for the clamshell cap configuration.

Additional Embodiments—Flip Cap

Figure 9A:
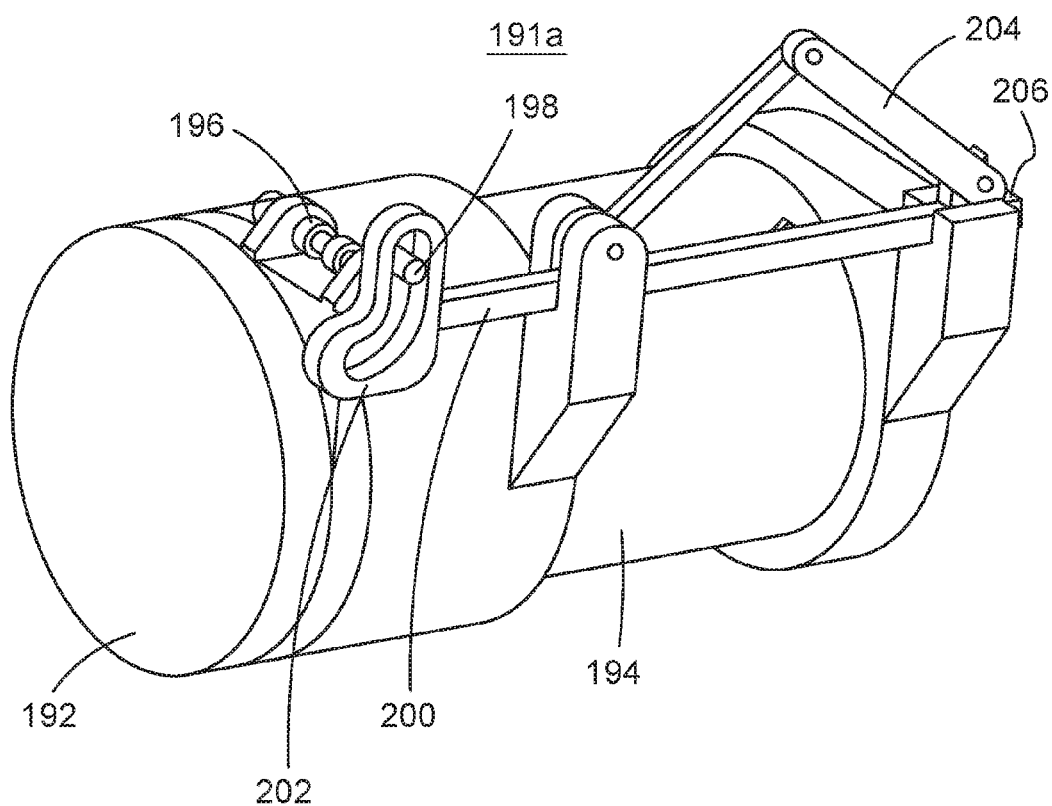
FIGS. 9A-9D show isometric views of an example of a flip cap configuration according to an embodiment.
Figure 9B:
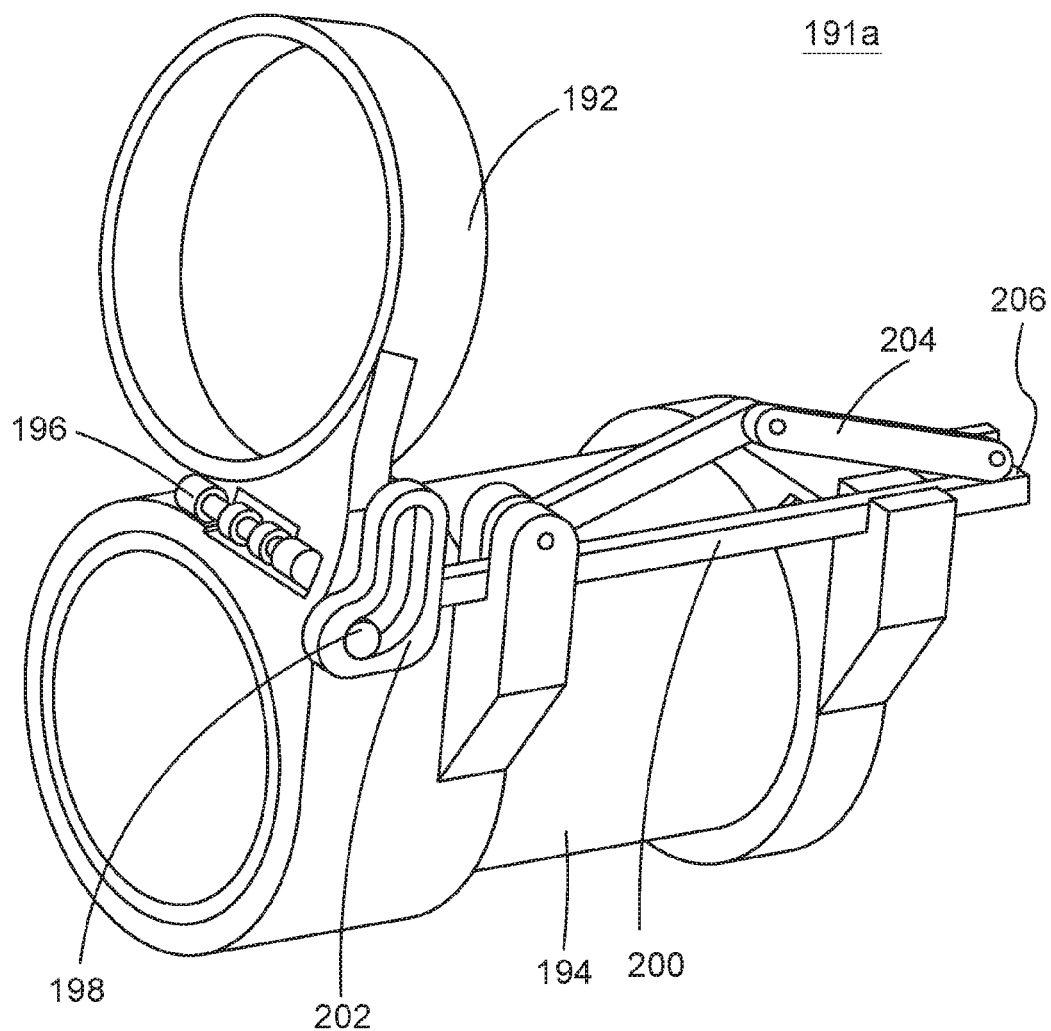

FIGS. 9A-9D show a debris exclusion and removal apparatus 190 (FIGS. 9C and 9D) having a flip cap configuration. In the illustrated example, a first portion 191a includes a first housing 194 with an open end and one or more surfaces defining a first cavity to receive a first connector (201 of FIG. 9D). In addition, a first cap 192 may be coupled to the first housing 194, wherein the first cap 192 is movable between a closed position (as shown in FIG. 9A) in which the open end of the first housing 194 is covered by the first cap 192 and an open position (as shown in FIG. 9B) in which the open end of the first housing 194 is not covered by the first cap 192.

A first hinge 196 may also be coupled to the first housing 194 and the first cap 192, wherein the first hinge 196 inverts the first cap 192 between the closed position and the open position. The illustrated first portion 191a also includes a first pin 198 extending laterally from the hinge, wherein a side rail 200 may extend longitudinally along the exterior of the first housing 194. The side rail 200 may have a first end 202 with surfaces defining an L-shaped (e.g., "sliding yoke") aperture to receive the first pin 198. Moreover, a multi-axis lever 204 (e.g., a full "lazy tong," a half "lazy tong," etc.) may be coupled to the first housing 194 and a second end 206 of the side rail 200, wherein the multi-axis lever 204 inverts the first cap 192 to the open position when the multi-axis lever 204 is squeezed toward the side rail 200.

Figure 9C:
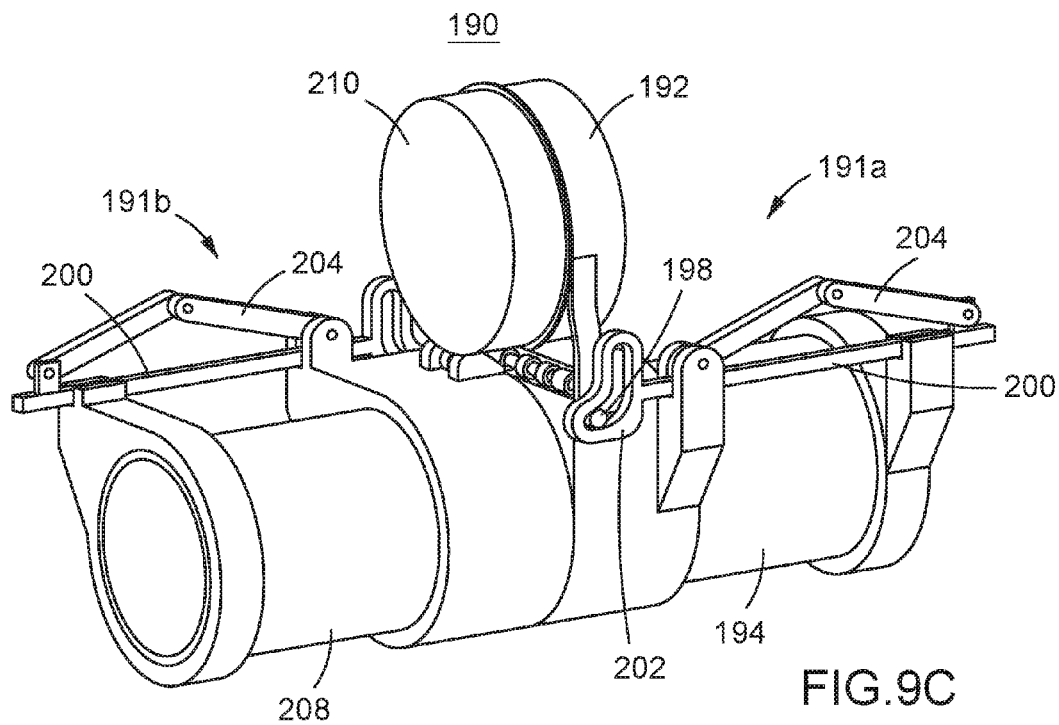
Figure 9D:
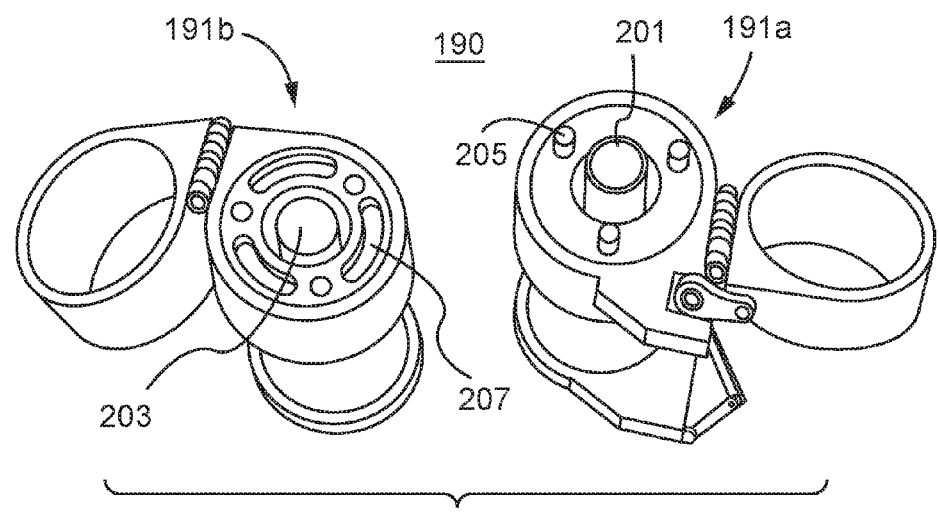

As best shown in FIG. 9C, a second portion 191b of the apparatus 190 may also have a second housing 208 with an open end and one or more surfaces defining a second cavity to receive a second connector (203 of FIG. 9D). A second cap 210 may be coupled to the second housing 208, wherein the second cap 210 is movable between a closed position in which the open end of the second housing 208 is covered by the second cap and an open position in which the open end of the second housing 208 is not covered by the second cap 210. The second portion 191b may also include a pin 198, side rail 200 and multi-axis lever 204 as already described with regard to the first portion 191a. Thus, when the open end of the first housing 194 and the open end of the second housing 208 are coupled to one another, the illustrated first and second caps 192, 210 seal one another. Such a seal may prevent dust and other debris from collecting within the first and second caps 192, 210.

Additionally, the open end of the first housing 191a may include a set of laterally extending protrusions 205 (as best shown in FIG. 9D) that are equi-angularly spaced apart from one another, wherein each protrusion corresponds to a set of apertures 207 in the open end of the second housing 191b. Furthermore, the protrusions 205 and apertures 207 operate as a cam and groove coupling that locks the first and second housings to one another via rotation. It should also be noted that the two halves (191a, 191b) of the apparatus 190 are mirror images of each other with respect to the hinge 196 location, such that the two hinges, one on each half (191a, 191b) of the apparatus 190, do not interfere with each other when the two parts of apparatus 190 are rotated and locked together.

Additional Embodiments—Intelligent Electrical Connector

Figure 10B:
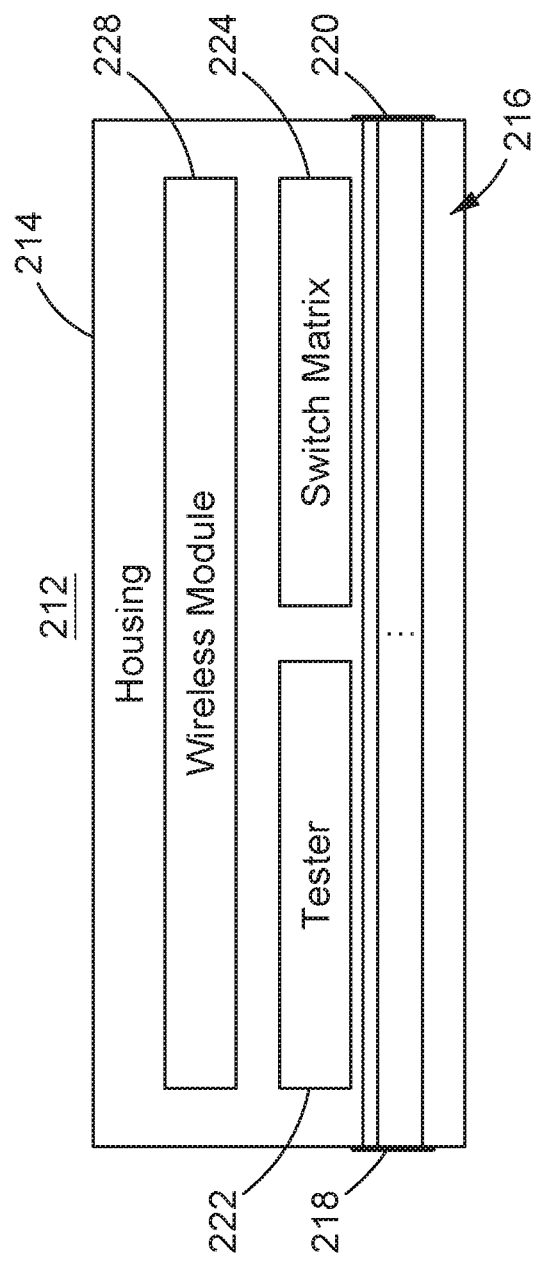

FIGS. 10A and 10B show an intelligent electrical connector 212 having a miniaturized configuration that is easily maintainable and serviceable (e.g., cable harnesses do not require disconnecting to diagnose conductor faults/damage). In the illustrated example, a housing 214 contains a plurality of conductors 216 (e.g., contacts, pins, sockets, wires, cables) coupled to a first port 218 and a second port 220. The housing 214 may generally have a small form factor that enables various components of a system to be connected to one another. For example, FIG. 10A demonstrates that the electrical connector 212 might be installed at opposing ends of a cable 226 having a set of conductors to transfer electrical current (e.g., signals and/or power) therebetween. In the illustrated example, a tester 222 is positioned within the housing 214, wherein the tester 222 may be configured to detect one or more faults associated with one or more of the plurality of conductors 216. Additionally, a switch matrix 224 may be positioned within the housing 214, wherein the switch matrix 224 is configured to cure the one or more faults with a re-routing of one or more of the plurality of conductors 216.

The electrical connector 212 may also include a wireless module 228 coupled to the tester 222 and the switch matrix 224, wherein the wireless module 228 may transmit notification information associated with the fault to a remote location (e.g., remote processor, server, facility, etc.). In such a case, the wireless module 228 may receive configuration information from the remote location, wherein the switch matrix 224 performs the re-routing based on the configuration information.

The tester 222 and/or the remote location may generally use time domain reflectometry (TDR) to detect open, shorted and intermittent circuits. Moreover, the switch matrix 224 may autonomously transfer damaged/defective conductors to alternate wire paths. The switch matrix 224 may also use interchangeable modular elements such as microelectromechanical systems (MEMS) to perform the re-routing. In a preferred embodiment, the switch matrix should be of the latching type to maintain configuration during power cycles. In one example, the contents of the housing 214 are integrated onto a common printed circuit board (PCB) (e.g., rigid, flexible), which facilitates miniaturization of the intelligent electrical connector 212.

One or more of the techniques described herein may be used separately or in combination with one another to enable the safe transfer of electrical current, fluid, and/or gas in harsh environments containing airborne debris as well as debris on the ground and/or floor.

Embodiments may therefore include a debris exclusion and removal apparatus comprising a first housing having an open end and one or more surfaces defining a first cavity to receive a first connector, and a first cap coupled to the first housing, wherein the first cap is movable between a closed position in which the open end of the first housing is covered by the first cap and an open position in which the open end of the first housing is not covered by the first cap.

Embodiments may also include a debris exclusion and removal apparatus comprising a male connector including a first poppet valve positioned between an inlet end of the male connector and a first chamber of the male connector, and a female connector including a second poppet valve positioned between an outlet end of the female connector and a second chamber of the female connector, and a third poppet valve positioned between the second chamber and a third chamber of the female connector, wherein when the second chamber contains a pressurized substance, coupling the male connector to the female connector causes the pressurized substance in the second chamber to clean the inlet end of the male connector.

Embodiments may also include a debris exclusion and removal apparatus comprising a female connector having an elongated configuration, a male connector having an elongated configuration that mates with the elongated configuration of the female connector, and a plurality of O-rings positioned along one of a shaft of the male connector or a bore of the female connector.

Embodiments may also include a debris exclusion and removal apparatus comprising a first housing including an open end and a first columnar array of filaments extending across the open end of the first housing, and a first connector positioned within the first housing.

Embodiments may also include a debris exclusion and removal apparatus, comprising a first connector having a male member with a first retractable cover positioned about an exterior of the male member, and a second connector having a female member with a second retractable cover positioned within an interior of the female member.

The term "coupled" may be used herein to refer to any type of relationship, direct or indirect, between the components in question, and may apply to electrical, mechanical, fluid, optical, electromagnetic, electromechanical or other connections. In addition, the terms "first," "second," etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A debris exclusion and removal apparatus comprising:
   a male connector including a first poppet valve positioned between an inlet end of the male connector and a first chamber of the male connector; and
   a female connector including a second poppet valve positioned between an outlet end of the female connector and a second chamber of the female connector, and a third poppet valve positioned between the second chamber and a third chamber of the female connector, wherein when the second chamber contains a pressurized substance, coupling the inlet end of the male connector to outlet end of the female connector causes the pressurized substance in the second chamber to clean the inlet end of the male connector;

wherein when an inlet end of the female connector is coupled to a source of the pressurized substance, the third chamber supplies the second chamber with the pressurized substance during a charging stage.

2. The apparatus of claim 1, wherein when the second chamber contains the pressurized substance, decoupling the male connector from the female connector causes the pressurized substance in the second chamber to clean the inlet end of the male connector.

3. The apparatus of claim 1, wherein the second poppet valve includes one or more surfaces defining a secondary substance path to supply the second chamber with the pressurized substance during the charging stage.

4. The apparatus of claim 1, wherein the third poppet valve includes one or more surfaces defining a primary substance path to supply the male connector with the pressurized substance during a supply stage.

5. The apparatus of claim 1, wherein the third poppet valve has an actuation force that is greater than an actuation force of the first poppet valve and the second poppet valve.

* * * * *